United States Patent

Geil

[15] 3,662,400

[45] May 9, 1972

[54] SUBSIDIARY DOCUMENT IDENTIFICATION SYSTEM

[72] Inventor: John H. Geil, Wichita, Kans.

[73] Assignees: Hinderstein & Silber, Fullerton, Calif.; International Systems, Inc., Wichita, Kans. , part interest to each

[22] Filed: Apr. 28, 1970

[21] Appl. No.: 32,610

[52] U.S. Cl. ....................444/1
[51] Int. Cl. ....................G06f 9/12
[58] Field of Search ....................340/172.5

[56] References Cited

UNITED STATES PATENTS 3,512,134 5/1970 Packard ....................340/172.5

*Primary Examiner*—Raulfe B. Zache
*Attorney*—Flam and Flam and Howard A. Silber

[57] ABSTRACT

In a data processing system employing a computer and a random access storage device, a program method for compiling a tier-ordered subsidiary document tree. The program method comprises three loops. A first loop culls from the random access storage device a word associated with a known Nth-tier parent document identification number, and enters into a matrix portion of the computer memory the subsidiary document identification numbers included in the culled word. The second loop enters the tier value N, the parent document identification number and part of the culled word into a storage file. The third loop determines from the content of the computer memory matrix portion the identification number of the next higher tier document to be searched, and causes reentry of the first loop to initiate such search. When all document identification numbers have been searched, the storage file contains the desired tier-ordered subsidiary document tree.

20 Claims, 15 Drawing Figures

INVENTOR.
JOHN H. GEIL
BY
Hinderstein & Silber
ATTORNEYS

INVENTOR.
JOHN H. GEIL
BY
Hinderstein & Silber
ATTORNEYS

INVENTOR
JOHN H. GEIL
BY
Hendersten & Silber
ATTORNEYS

| 74 TIER (N) | 75 NUMBER (R) | 71 DOCUMENT IDENTIFICATION NUMBER | 72 DATE | R | I | NSCA | FSC | DESCRIPTION | 77 FIRST TIER PARENT | 76 REFERENCE NUMBER |
|---|---|---|---|---|---|---|---|---|---|---|
| 1 | 1 | MIL-W-5088 | 26 MAY 65 | C | | | 15GP | WIRING, AIRCRAFT INSTALLATION | | |
| 2 | 2 | AND-10106 | 29 APRIL 48 | | | R3 | MISC | TUBING, STANDARD SIZES | | |
| 3 | 3 | WW-T-787 | | | | | | AVAILIBILITY BEING RESEARCHED | | |
| 2 | 4 | AN-3057 | 10 JAN 60 | | | | | ADAPTER, ELECTRICAL ACCESSORY | | |
| 2 | 5 | AND-10380 | 31 OCT 49 | | | R1 | MISC | FITTING INSTALLATION, STANDARD | | |
| 3 | 6 | TT-T-266 | 22 OCT 59 | B | | | 8010 | THINNER, DOPE & LACQUER | | |
| 4 | 7 | FED-STD-102 | 29 JAN 63 | B | | | PACK | PRESERVATION, PACKAGING | | |
| 4 | 8 | FED-STD-141 | 1 SEPT 65 | A | | | 8010 | PAINT, VARNISH | | |
| 4 | 9 | AN-TT-T-256 | 4 MAR 55 | | | | 8010 | THINNER, CELLULOSE | | 11 |
| 3 | 10 | WW-C-561 | 18 FEB 60 | | | | | CANCELLED DOCUMENT | | |
| 3 | 11 | AN-TT-T-256 | 4 MAR 55 | | | | 8010 | THINNER, CELLULOSE | | |
| 2 | 12 | MIL-B-5087 | 15 OCT 64 | B | | | 6150 | BONDING, ELECTRICAL & LIGHTING | | |

(73 spans columns R through DESCRIPTION)

FIG-7

INVENTOR.
JOHN H. GEIL
BY
Hinderstein & Silber
ATTORNEYS

INVENTOR.
JOHN H. GEIL
BY
Hinderstein & Silber
ATTORNEYS

INVENTOR
JOHN H. GEIL
BY
Hinderstein & Silber
ATTORNEYS

FILTERED TREE GENERATION

INVENTOR.
JOHN H. GEIL
BY
Hinderstein & Silber
ATTORNEYS

DELTA TREE GENERATION

INVENTOR.
JOHN H. GEIL
BY
Hinderstein & Silber
ATTORNEYS

SUBSIDIARY DOCUMENT IDENTIFICATION SYSTEM

BACKGROUND OF THE INVENTION

1. Field of the Invention

The present invention relates to data processing systems, and more particularly, to a program method for directing the operation of a data processing system so as to compile a tier-ordered subsidiary document tree.

2. Description of the Prior Art

With the event of the so-called information explosion, ever increasing bodies of knowledge in all fields are becoming well documented, and the concomitant problem of cross-referencing between documents is becoming increasingly more complex. Thus when researching a particular area of knowledge, a particular article, text book or document may cross-reference numerous other articles or publications which also contain detailed information on various aspects of the subject field of knowledge. In turn, these latter or second tier documents themselves may cross-reference still other documents. A complete compilation of all subsidiary documents directly or indirectly referenced by the initial or first-tier documents well may comprise a list of hundreds if not thousands of entries.

In various specialized areas, generation of tier-ordered subsidiary document trees is of particular importance and complexity. Typical of such applications is that relating to government specifications. As is well known, various agencies of the U.S. Government issue numerous procurement, performance, testing and other specifications. Typically such specifications will describe the required performance, appearance or physical characteristics of a component or system; will describe the processes by which such items must be fabricated; or will detail the order in which various tests of such items must be carried out. In general, such government specification incorporates by reference one or more subsidiary specifications, each of which in turn may incorporate by reference yet other specifications.

A company doing business with U.S. Government generally is contractually obligated to meet the requirements of one or more government specifications listed in the request for bid or in the contract. As noted, these specifically designed, first-tier specifications may incorporate by reference other second-tier specifications, which in turn may incorporate by reference still other third tier specifications. Thus, a seemingly innocuous contractual requirement that the company perform to the requirements of but a few government specifications may in fact obligate the contractor to meet the requirements of an extremely large number of other higher tier specifications.

Clearly it is of utmost importance that a potential government contractor be aware of all specifications subsidiary to those particularly enumerated in the request for bid. Only with such detail subsidiary specification tree information can the potential contractor accurately predict his contract performance costs, so as to submit a realistic bid. Without such subsidiary specification information, a bidder well may estimate his costs at an amount much less than actually required to meet the performance, process or testing requirements set forth in the unknown subsidiary specifications.

Not only is detail subsidiary specification tree information of importance at the time of bid, it also is important at the time of actual contract award. Typically, many months pass between the time a potential contractor submits his bid to the government and the time when the contract award is made. In the interim, numerous changes may have been made to the specifications included in a subsidiary specification tree generated at the time of bidding.

Of the approximately 200,000 current U.S. Government specifications, some 2,000 amendments, changes, revisions or cancellations are made each month. It is apparent that the scope of work contractually required at the time of contract award may be significantly different from the scope of performance called out at the time of bidding. Thus, a knowledge of which required specifications have been changed, amended, deleted, or perhaps added in the interim between bid submission and contract award is of great value in negotiating, concurrent with contract award, changes in performance schedule or cost necessitated by changes in detail subsidiary specification tree content in the interim since bid submission.

In the past, generation of detail subsidiary document trees has been accomplished manually. Such manual compilation not only is unacceptably tedious, time-consuming and expensive, but also is subject to error resulting from the large number of documents which must be screened by the compiler. The inventive program method facilitates the automatic compilation of tier ordered subsidiary document trees, rapidly and with exceptional accuracy.

SUMMARY OF THE INVENTION

In accordance with the present invention, there is provided a program method for directing the operation of a data processing system so as to compile a tier-ordered subsidiary document tree. The tree is derived from a master file comprising a random access storage device in which is stored a plurality of words, each word containing a particular parent document identification number and a listing of the identification numbers of documents referenced as subsidiaries by that parent document.

The inventive program method comprises several interrelated loops. A first loop culls from the random access master file that word associated with a known Nth-tier parent document and identification number. Should the master file include more than one entry having the same parent document identification number, as may be the case when the document has been amended or revised, the entry effective as of a preselected control date is culled. If the parent document has not previously been accessed at the same or lower tier, the master file word is appropriately tagged to indicate this fact. The second loop enters into a search matrix portion of the computer memory the subsidiary document identification numbers included in the word culled from the master file by the first loop. The search matrix entries are arranged so that subsidiary documents subsequently are searched in ascending tier order.

The third loop directs preparation in an appropriate computer storage unit of a dump file word associated with each document in the compiled subsidiary tree. Each dump file word includes the document identification number, an ordinal sequence number, a number indicating the tier level at which the document appears, and various descriptive information relating to the document and copied from the corresponding master file word.

The fourth loop scans the memory search matrix portion to determine therefrom the next parent document identification number to be searched. When this number has been identified, the first loop is reentered.

An optional fifth loop sequentially scans each dump file entry to determine which, if any, document identification numbers appear more than once in the generated subsidiary tree. By reference to the corresponding tagged master file words, the fifth loop enters in such redundant dump file words the sequence number at which the same document identification number first appeared at the lowest tier in the compiled subsidiary document tree.

Another routine permits generation of a filtered subsidiary tree nonredundantly listing each document included in the detail subsidiary document tree compiled by the inventive program method. Such filtered tree generation may be accomplished simply by deleting those dump file words having an entry in their reference number field indicating that the same document identification numbers appears elsewhere in the detail tree. In a more sophisticated embodiment, the filtered tree generation system may incorporate in each subsidiary document word an indication of the first tier parent of that document. Further, a tier-ordered printout of the filtered tree may be arranged in alpha- or numeric order by document identification number.

A delta subsidiary document tree program method also is provided which facilitates comparison of detail or filtered subsidiary document trees generated as of two different control dates. The delta tree printout indicates whether additions, amendments, changes, revisions or cancellations of subsidiary documents have occurred in the interim between control dates.

Thus, it is a principal object of the present invention to provide a program method for directing the operation of a data processing system so as to compile a tier-ordered subsidiary document tree.

Another object of the present invention is to provide, in a data processing system employing a computer and a random access storage device, a program method for compiling a subsidiary document tree.

It is another object of the present invention to provide a new and improved system for generating a list of documents cross-referenced by a set of first-tier documents.

A further object of the present invention is to provide a program method for compiling a detail listing of all documents, effective as of a preselected date, subsidiary to a known set of documents.

Yet a further object of the present invention is to provide a program method for directing a data processing in the compilation of a nonredundant listing of documents subsidiary to a particular first-tier document.

A still further object of the present invention is to provide a program method for determining differences in the content of subsidiary document trees generated from the same set of first-tier documents on different dates.

BRIEF DESCRIPTION OF THE DRAWINGS

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

FIG. 7 represents by way of example the content of sequential damp file words generated in the storage unit illustrated in FIG. 1 during subsidiary document tree compilation in accordance with the inventive control system.

Figure 1:
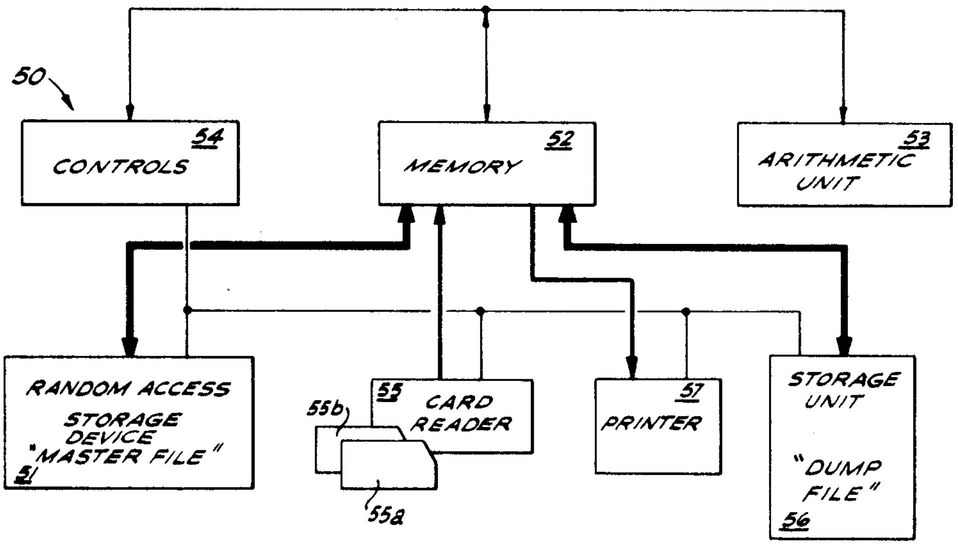
FIG. 1 is a block diagram of a data processing system utilizing the inventive program method for compiling a tier-ordered subsidiary document tree. The illustrated system incorporates a random access storage device the contents of which are identified as a "master file" and another storage unit in which is generated the "dump file" containing the desired subsidiary document tree.

FIGS. **8*a*, 8*b* and 8*c* together comprise a flow chart illustrating a program of control of the data processing system of FIG. 1** to carry out tier-ordered detail subsidiary document tree compilation in accordance with the present invention.

Figure 9:
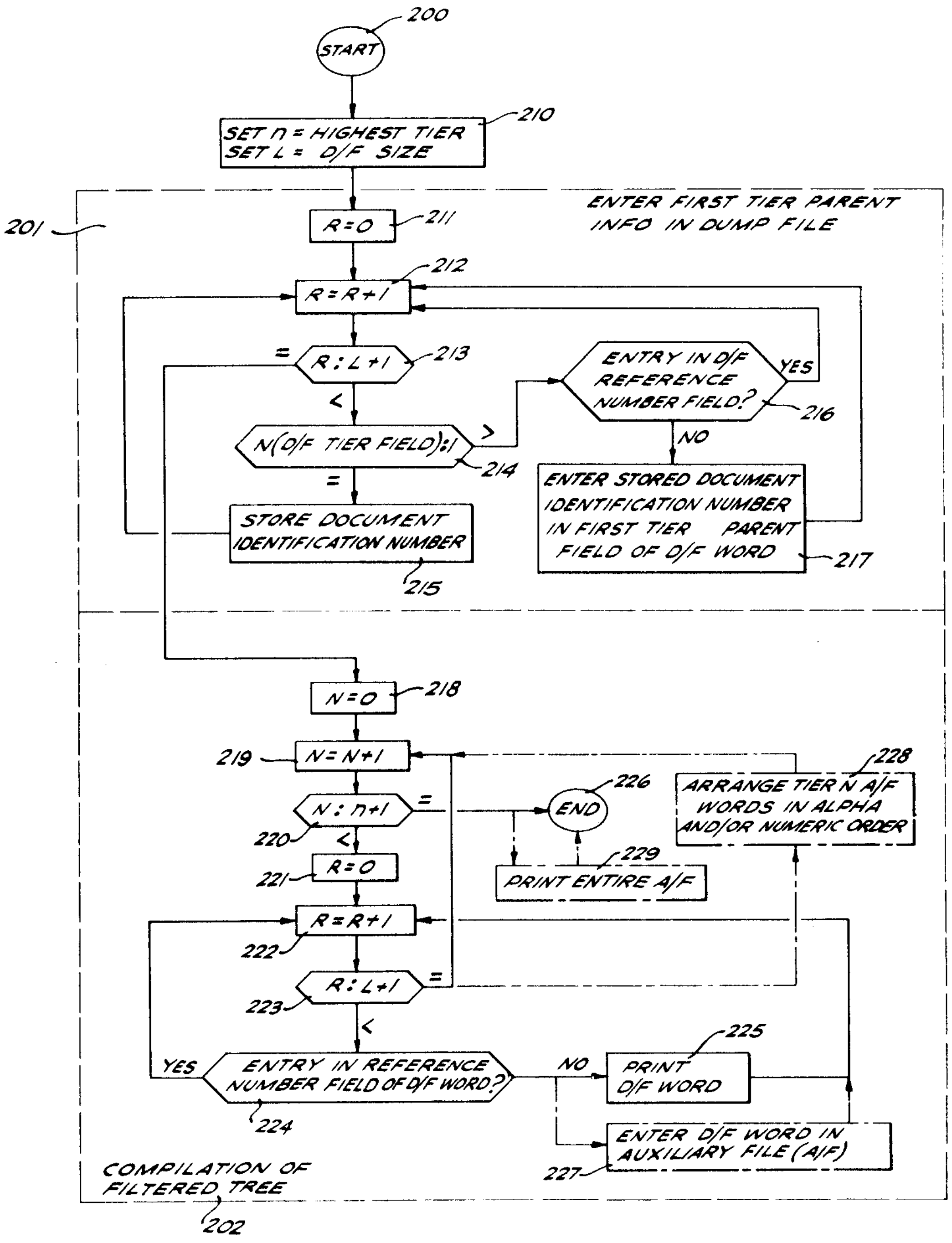

FIG. 9 is a schematic block diagram of a flow chart illustrating a program of control of the data processing system of FIG. 1 to accomplish filtered subsidiary document tree generation in accordance with the present invention.

Figure 10:
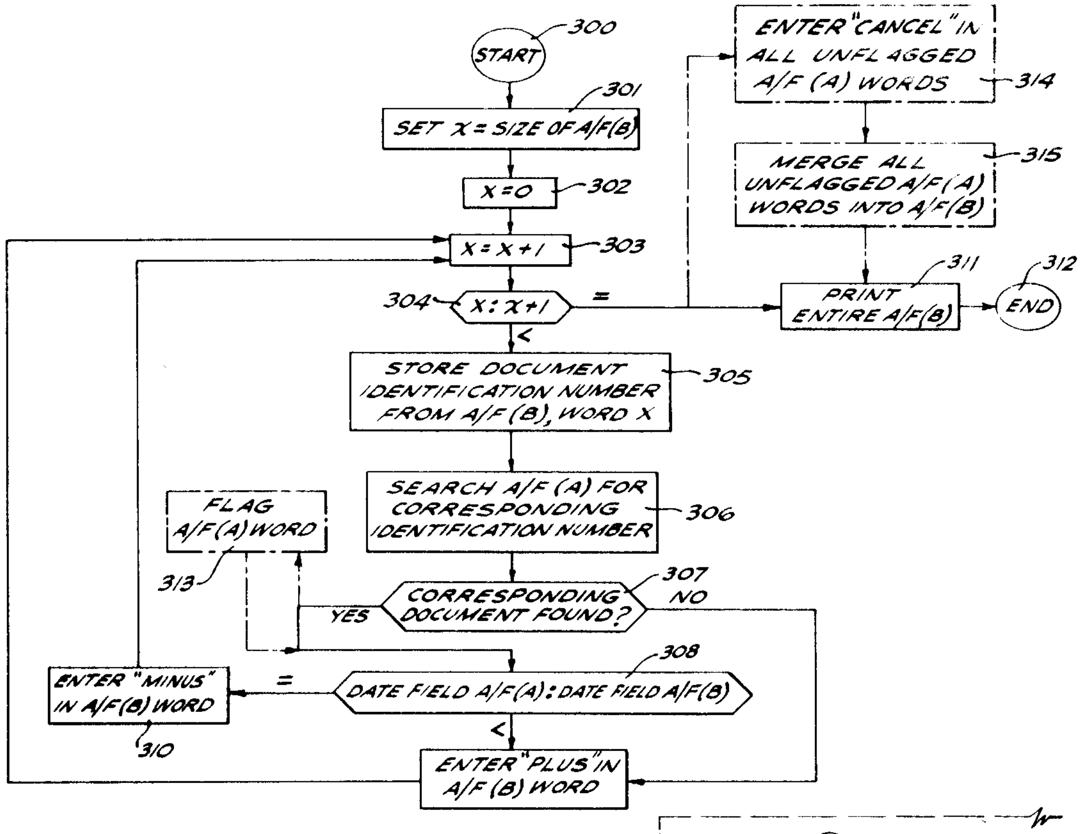

FIG. 10 is a schematic block diagram of a flow chart illustrating a program of control of the data processing system of FIG. 1 to carry out delta subsidiary document tree generation in accordance with the present invention.

Figure 8A:
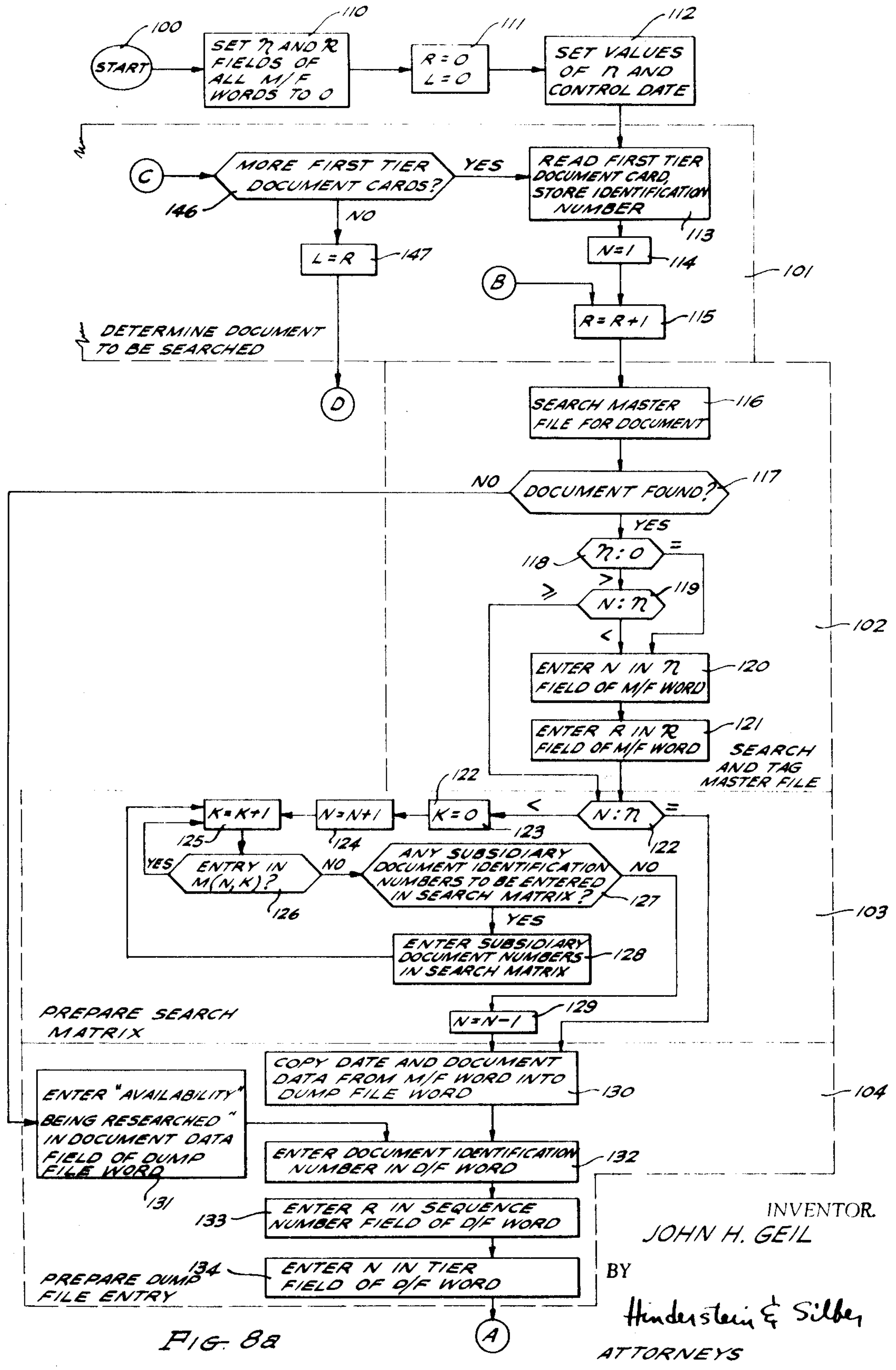

FIGS. **11*a*, 11*b* and 11*c* comprise partial flow charts which together with the flow chart of FIG. 8*a* illustrate a program of control of the data processing system of FIG. 1 to carry out tier-ordered subsidiary document tree compilation. Determination of the next document identification number to be searched is made by reference to a table containing the locations of the next unsearched entries in each column of the search matrix of FIGS. 4, 5 and 6**.

DESCRIPTION OF THE PREFERRED EMBODIMENT

Referring now to the drawings and particularly to FIG. 1 thereof, there is shown a data processing system 50 of the type incorporating a random access storage device such as that designed master file 51. Data processing system 50 also includes a memory 52 an arithmetic unit 53, and a set of controls 54. The system is adapted to receive input data from a device such as card reader 55. Data processing system 50 also includes an additional data storage unit 56 which may comprise a disc file, a drum memory, a magnetic tape unit or the like; storage unit 56 need not be of the random access variety. System 50 also incorporates a printer 57 on which hard copy output data may be obtained.

Data processing system 50 may be any suitable form of digital computer in which data stored memory 52, random access device 51 or storage unit 56 is supplied under the direction of controls 54 to arithmetic unit 53 for processing and then returned to memory 52, storage device 51 or storage unit 56 to be stored at an appropriate location therein. Controls 54 determine the memory locations from which information is taken to be processed in the arithmetic unit, the particular operations to be performed by the arithmetic unit, and the memory or storage locations to which the information is returned. Controls 54 also determine the timing of the flow of electrical signals representing the information, as well as the time relations of the different system operations. Further, controls 54 direct random access searching of master file 51.

The various connections between the components of data processing system 50 are shown by single lines in FIG. 1, with arrowheads representing the direction of control or information signal flow. In practice, various numbers of such control lines are required, and the details here are omitted since they are unnecessary to an understanding of the invention.

Data processing system 50 may be any of various well-known types of systems such as that involving a program stored in memory 52 in the form of signals representing sequences of control instructions which are supplied to controls 54 from storage in memory 52 as called for to perform the required operations. Alternatively, the controls 54 may have a fixed program wired and/or built in which may take the form of logic combinations of gates or other circuits to perform the proper sequence of operations in accordance with well known techniques.

Figure 2:
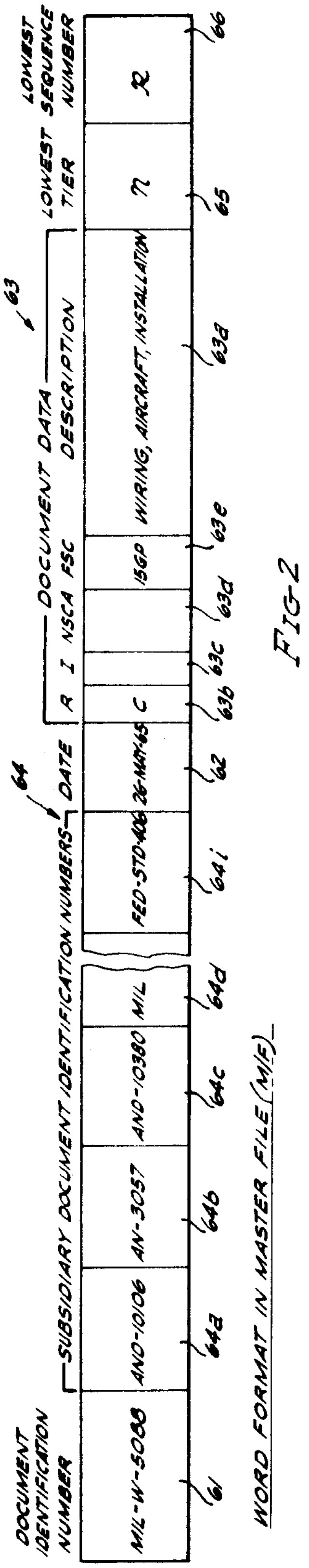
FIG. 2 illustrates the format of a typical master file word as contained in the random access storage device illustrated in FIG. 1.

Random access storage device 51 functions as the master file in the inventive subsidiary document identification system. Thus, in master file 51 is stored a word (i.e., a set of data signal combinations) representing each parent document encompassed by the system, together with an identification of each subsidiary document referenced by the parent document. This best is illustrated in FIG. 2 which shows the data format of each entry in master file (M/F) 51. As seen therein, each word in the master file contains a number of fields. Typically, these may include the parent document identification number field 61, the effective document date field 62, the document data field 63, and a field 64 containing the identification numbers of documents subsidiary to the parent document identified in field 61. The length of each of fields 61, 62 and 63 may be fixed, while typically the length of subsidiary document number field 64 will not be fixed, but will vary depending on the number of subsidiary documents referenced by the parent. In any event, subsidiary document field 64 may be divided into a plurality of sub-fields or bytes **64*a*, 64*b*, 64*c* ... 64*i***, where *i* represents the number of subsidiary documents referenced by the parent. The master file data word format also includes two fields 65 and 66, herein designated "lowest tier" and "lowest sequence number in lowest tier," each typically of fixed length, the function of which will be apparent from the description of the inventive subsidiary document identification system set forth hereinbelow.

The data format in master file 51 further may be understood by way of a typical example wherein the subsidiary document identification system is used to identify higher tier government specifications referenced by other specifications. Thus, in the example illustrated in FIG. 2, stored in parent document identification number field 61 is the specification identification MIL-W-5088. The effective date of the specification, May 26, 1965, is contained in date field 62, while the description portion 63*a* of document data field 63 contains the abbreviated title "Wiring, Aircraft, Installation" of specification MIL-W-5088. Document data field 63 also contains miscellaneous other identification with respect to document MIL-W-5088, including an indication that this document is revision C (see REV. field 63*b*), an indication of whether this is an interim document (see I field 63*c*), identification of the latest notice, supplement or change amendment (see NSCA field 63*d*), and the federal supply code, herein 15GP, as indicated by the FSC field 63*e*.

Still referring to FIG. 2, in the actual government specification MIL-W-5088, 10 subsidiary documents are identified. Thus, the subsidiary document identification number field 64 for MIL-W-5088 will include 10 subsidiary subfields, each containing the identification number of one of the subsidiary documents referenced in MIL-W-5088. Thus, as indicated in FIG. 2, sub-fields 64*a*, 64*bc* 64*c* ... 64*i* contain the referenced subsidiary document identification numbers AND-10106, AN-3057, AND-1038, ... FED-STD-406.

It will be appreciated that master file 51 will contain a large number of entries such as that typified by FIG. 2. In particular, there will be at least one such entry for each document encompassed by the subsidiary document identification system. Moreover, in many cases, there will be more than one such entry per document, where a particular document has been revised, amended or cancelled. In this instance, the master file will contain an entry with the same document identification number (in field 61) for each revision, amendment, or as the case may be, cancellation. In each such word, the date field 62 will have a different entry. As will be described hereinbelow, this facilitates subsidiary document identification as of a particular date. Since master file 51 is of the random access variety, there is not requirement that the various entries for the same document be stored sequentially in the master file, however, such segmented storage may reduce M/F search time.

The data in fields 61–64, inclusive, of each word in master file 51 remain fixed throughout operation of the subsidiary document identification system. However, the entries in fields 65 and 66 are altered in the course of operation of the system. The entries in these respective fields are identified in FIG. 2 and throughout the present description by the nomenclature *N* and *R*, respectively.

In operation of the subsidiary document identification system, it is desired to generate a listing or detail tree of documents subsidiary to one or more known first tier documents. Typically, card reader 55 (see FIG. 1) will be used as the device for inputting to the system the first tier document identification numbers. In this instance, a set of cards 55*a*, 55*b*, ... will be provided, each containing the document identification number of one first tier document, the subsidiaries of which it is desired to obtain.

Operation of the inventive subsidiary document identification system is initiated by entering into a portion of memory 52 or other appropriate register a control date which will be used by the system to insure selection of the document revision or amendment effective as of the control date. The control date may be entered either manually, using appropriate selectors (not shown in FIG. 1), by utilizing card reader 55 for this purpose, or by means of other input device well known to those skilled in the art. Having thus stored the control date, card reader 55 may be used to enter the initial first tier document identification number from card 55*a* into an appropriate register portion of memory 52 or other suitable register. A random search of master file 51 then is made to find the entry or entries having in their field 61 (see FIG. 2) a document identification number identical to that of the first tier document identification number read from card 55*a* and stored in a register portion of memory 52.

In some systems, random access searching may be carried out not by reference to a designated memory storage location, but rather by comparing the data contained in a particular field of each word stored in the random access storage device with the data being sought. Thus, in the present case, if card 55*a* identified the initial first tier document to be sought as MIL-W-5088, this identification number would be stored in the register portion of memory 52 and a search would be made (under direction of controls 54) of the document identification field 61 of each data word in master file 51. Coincidence of the entry in field 61 and the identification number stored in the register portion of memory 52 indicates that an appropriate word has been found in master field 51.

As noted earlier, several such words, all associated with the same parent document identification number, may be found in the search of random access master file 51. Of course, this will result when one or more revisions, amendments or changes of the document have been issued, the various entries indicating (in date field 62) the effective date of the particular revision, amendment, change or cancellation. A comparison then will be made (as by arithmetic unit 53) between the control date stored in memory 52 and the date contained in field 62 of each of the M/F words associated with the document being sought. That data word having the latest date prior to the control date will be selected or culled from the master file for subsequent utilization.

The data word thus culled from the master file 51 contains in field 64 a listing of the identification numbers of subsidiary documents referenced in the parent document. These subsidiary document identification numbers now are stored in an appropriate portion of memory 52, herein designated the search matrix or memory matrix portion. As will be described in detail hereinbelow, the inventive subsidiary document identification system will look to the search matrix to determine which subsidiary document next is to be searched in master file 51.

Since the document initially searched in master file 51 was a first tier document, the number 1 (indicating first tier) is entered in the *N* or "lowest tier" field 65 (See FIG. 2) of the data word culled from master file 51. Also, since this was the first document retrieved, the sequence number 1 is entered in the *R* "lowest sequence number in lowest tier" filed 66 of the culled word in master file 51.

Figure 3:
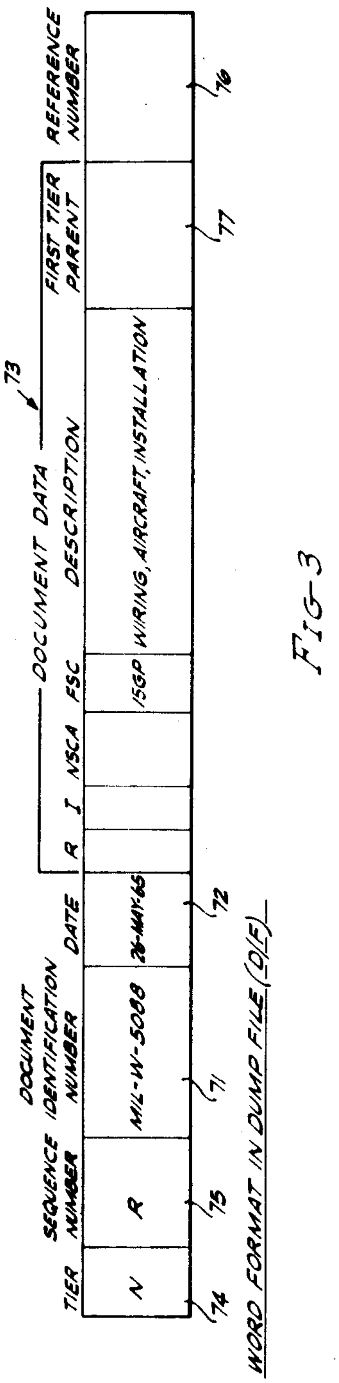
FIG. 3 illustrates the format of a typical dump file word generated in the storage unit shown in FIG. 1.

At this stage, generation of the desired detail subsidiary document tree in storage file 56 is initiated. That is, a pertinent document information is entered into storage unit 56 to form therein a dump file (D/F). The data format in the dump file is indicated in FIG. 3. As may be seen therein, each D/F word contains a document identification number field 71 which is filled by copying the parent document identification number stored in the register portion of memory 52. The date field 72 and a document data field 73 are filled by copying into these fields respectively the contents of the date field 62 and document data field 63, of the parent document word culled from master file 51.

Still referring to FIG. 3, the dump file word also contains a tier field 74 into which is entered the tier N of the document searched. In the present example, since MIL-W-5088 was a first tier document initially identified by an input card 55*a*, the number 1 is entered in tier field 74 of the dump file entry. The dump file word also contains a sequence number field 75 into which the sequence number R of the retrieved document is entered. Note that entries are added to the dump file in ordinal fashion, R indicating the sequence number of the entry. The dump file data word also contains a reference number field 76 and a first tier parent field 77. As will be described hereinbelow, field 76 eventually is filled with a number indicating the sequence number at which the same document first appeared in the generated tree at the lowest tier lever. Field 77 eventually is filled with the document identification number of the first tier document to which the entry is subsidiary.

To review, system operation is initiated by the reading of an input card 55a containing the document number of a first tier document subsidiaries of which are to be identified by the inventive system. The parent (initially, first tier) document identification number is stored in a register portion of memory 52. A random access search made of master file 51 is made to find the data word corresponding to the stored parent document identification number, and having the date most recently preceding a control date also entered in memory 52. When the desired word is culled from master file 51, the subsidiary document numbers identified in that word are entered in a search matrix portion of memory 52. A sequence number is assigned, and the sequence number, tier, and document identification number are entered into dump file 56. The document date and data are copied from the culled master file word into the dump file. Since the culled master file word related to a first tier document, the tier and sequence number also are entered in the master file word.

Figure 4:
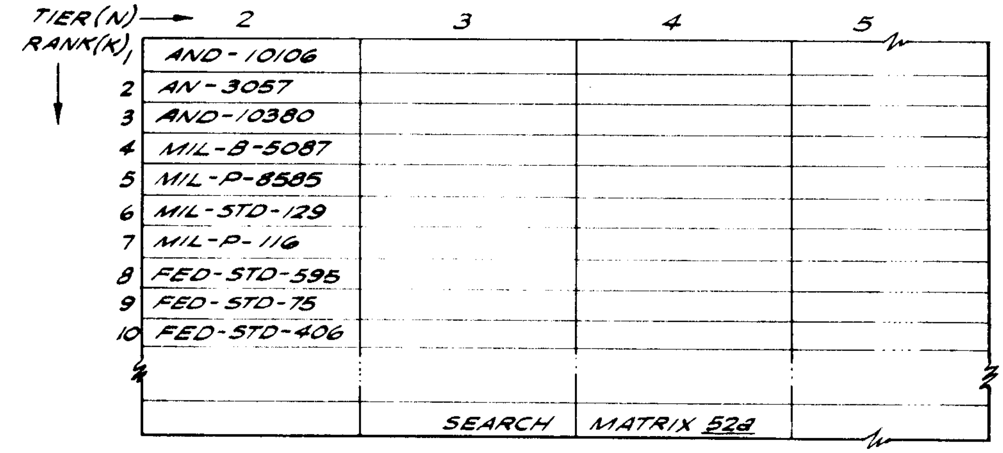
FIGS. 4, 5 and 6 symbolically illustrate the contents of the memory search matrix portion of the data processing system shown in FIG. 1 at various times during operation of the inventive program method; a typical set of data is shown.

As illustrated in FIG. 4, the search matrix portion 52a of memory 52 comprises an array of fields the columns of which are identified by tier number N, the rows of which are identified by a rank number K. Thus, a particular matrix position may be identified by the vector M(N,K). As noted earlier, when the initial first tier document data word was culled from master file 51, the therein identified subsidiary document identification numbers were entered into search matrix 52a. Since these subsidiary documents are all referenced directly by a first tier document, they all represent second tier (N=2) documents. Thus, these subsidiary documents will be entered in the second tier (N=2) column of matrix portion 52a. The documents are entered in the lowest consecutive available rows (rank positions) of the matrix.

Thus, referring once again to out first tier example MIL-W-5088, the subsidiary document identification numbers AND-10106, AN-3057, AND-10380, ... FED-STD-406 are entered in rows K=1 through K=10, respectively, of memory matrix portion 52a, as shown in FIG. 3. The document next to be searched in master file 51 then is identified by reference to the contents of search matrix portion 52a of memory 52.

The inventive subsidiary document identification system next initiates search of master file 51 for the first subsidiary (i.e., second tier) document referenced by the initial first tier document (in our example, MIL-W-5088). By reference to search matrix portion 52a, the system under the direction of controls 54 determines that there are no subsidiary document identification numbers stored in search matrix columns (see FIG. 4) other than that associated with the second tier (N=2). Since none of the documents identified in column N=2 have yet been searched, the document identification number stored in row K=1 of search matrix 52a is recognized as identifying the document next to be searched. This document identification number (in the example AND-10106) then is entered in the register portion of memory 52 in place of the number (MIL-W-5088) previously stored therein. The search matrix entry at tier N=2, rank K=1 is appropriately flagged (as with an asterisk) to indicate that this document has been searched.

Figure 5:
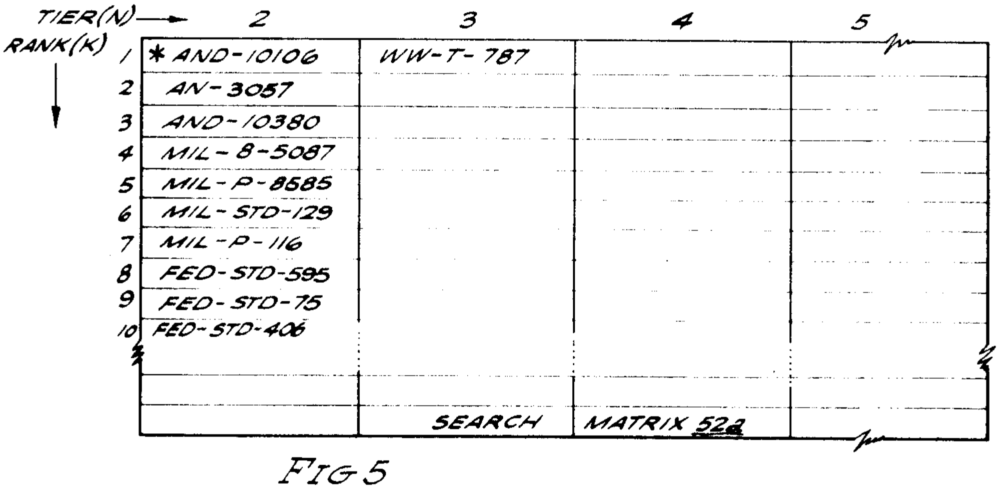

A random access search of master file 51 is then carried out under the direction of controls 54 (see FIG. 1), and the data word corresponding to the stored parent document number (AND-10106) and having the most recent date prior to the control date is culled from master file 51. The subsidiary document identification numbers read from thus culled word are entered in a appropriate positions in search matrix portion 52a. Since the document searched (AND-10106) was itself a second tier (N=2) document, these subsidiary document identification numbers represent third tier documents and will be entered in tier N=3 of search matrix 52a. In the present example, document AND-10106 has only one subsidiary document, WW-T-787; this document identification number is entered in the third tier (N=3) column, lowest available rank (R=1), of search matrix 52a, as shown in FIG. 5. Note also in FIG. 5 that the entry in tier N=2, rank K=1 has been flagged with an asterisk indicating that the entry previously was searched.

The inventive subsidiary document identification system then makes a second entry in dump file 56. This entry includes the identification number of the document searched (AND-10106), the sequence number R=2 (as this is the second D/F entry), and the tier N=2, corresponding to the tier column in which the document was identified in search matrix 52a. Then, the document date and document data are copied from the word culled from master file 51 into the corresponding fields 72 and 73 of the second (R=2) word in dump file 56.

Since this is the first time the word having parent document identification number AND-10106 has been culled from master file 51, an entry is made in the M/F word to indicate that it was retrieved as a second tier document, with sequence number R=2. That is, the value $N=2$ is entered in highest tier field 65, and the value $R=2$ is entered in the lowest number in lowest tier field 66 (see FIG. 2) of the M/F word.

To insure that dump file 56 is generated in a form wherein subsidiary documents are identified in ascending tier order, the entry in search matrix 52a with the highest tier value N next is searched. By reference to FIG. 5, it may be seen that the next document to be searched is WW-T-787. A random access search in master file 51 is carried out in the manner described above for the word having parent document identification number WW-T-787, and the most recent effective date prior to the control date.

Should no M/F word be found having the sought identification number WW-T-787, no subsidiary document identification numbers are entered in the fourth tier (N=4) column of search matrix 52a. However, the tier (N=3), the sequence number (R=3), the document identification number (WW-T-787), and the words "AVAILABILITY BEING RESEARCHED" all are entered into appropriate fields of the third word in dump file 56. The entry in tier N=3, rank R=1 of search matrix 52a is flagged as searched.

Since all of the third tier entries (i.e., the single entry WW-T-787) in memory search matrix portion 52a have been searched, the contents of the N=3 column of storage matrix 52a is cleared. The next document searched is that identified in the second tier (N=2) column, the lowest rank not yet searched; in this case, the next document searched is AN-3057. The search is done in the manner described hereinabove, with the document identification number (AN-3057), the tier (N=2), the sequence number (R=4), the document date and document data being entered into the fourth word position in dump file 56. Document AN-3057 having no subsidiaries, no additional entries are made in the third tier (N=3) column of search matrix 52 and the next document searched is that in the second tier ($n=2$) column, third row (K=3), the exemplary document being AND-10380.

The subsidiary documents of AND-10380 include TT-T-226, WW-C-561 and AN-TT-T-256. In a manner analogous to that described above, the next subsequent document searched is TT-T-266 this being the unsearched document of highest tier, lowest rank. Document TT-T-266 in turn has subsidiary documents FED-STD-102, FED-STD-141, and AN-TT-T-256. These document identification numbers will be entered in the fourth tier (N=4) column, rows K=1 through K=4 of search matrix 52a. At this stage in system operation the memory search matrix portion 52a has the contents indicated in FIG. 6; note therein that previously searched document TT-T-266 has been flagged with an asterisk.

In general, the next parent document to be searched is that identified by the unflagged entry in the matrix location M(N,K) having highest tier (N) value, lowest rank (K) value. Thus in the example shown in FIG. 6, the fourth tier (N=4)

column is the highest tier column containing entries still to be searched. The entries in this column are searched in ascending rank (row) order, so that document FED-STD-102 will be the next item searched. Assuming FED-STD-102 has no subsidiaries, the next subsequent document to be searched will be that identified in tier N=4, rank K=2 (i.e., FED-STD-141). If FED-STD-141 also has no subsidiary documents, the system next will search AN-TT-T-256. If this document also has no subsidiaries, the system will recognize that all entries in the fourth tier column have been searched, this tier will be cleared, and the next document searched will be the first unflagged document in the third tier column, which in this example of FIG. 6 will be WW-C-561.

On occasion that same document may appear in the generated subsidiary document tree more than once, either at the same or different tier level. For reasons which will become apparent hereinbelow, it is desirable in this instance to tag the master file parent document word with an indication of the lowest tier and lowest sequence number at which the document appeared in the generated tree. As noted earlier, fields 65 and 66 in the parent document M/F data word are used for this purpose.

During a search of the master file, when a tier N parent document word is retrieved, a comparison is made by arithmetic unit 53 under the direction of controls 54 to determine the tier ($N$) at which the same document previously was culled from master file 51. If the document previously occurred at a lower tier lever ($N$<N), the values of $N$ and $R$ are left unchanged in the M/F word. Similarly, if the document previously was found at the same tier level ($N$=N), no changes are made in the contents of fields 65 and 66 of the parent document word in master file 51. This is so since field 65 already contains the lowest tier at which the document has appeared, and field 66 indicates the lowest sequence number in that tier at which the document appeared, the present search being at a higher sequence number (R>$R$).

Should the parent document subsequently be retrieved at a lower tier level than that at which the document earlier was found (i.e., N<$N$), field 65 of the M/F parent document word will be altered so as to contain the new lower tier value. Additionally, the contents of field 66 also will be altered to enter therein the sequence number of the present search. In this manner, fields 65 and 66 of each data word retrieved from master file 51 during generation of the subsidiary document tree will contain an indication of the lowest tier and lowest sequence number within that lowest tier at which the particular document was retrieved.

It will be appreciated that when each of the document identification numbers entered in search matrix 52$a$ has been searched, a complete subsidiary document tree has been generated for the initial first tier document identified by card 55$a$. At this point, the system again looks to card reader 55 (see FIG. 1) to determine the presence of additional first tier document input cards. If another input card (i.e., card 55$b$) is present, that input card is read by card reader 55, the first tier document identification number contained therein is entered in the register portion of memory 52, and a subsidiary search is performed in a manner identical to that described hereinabove in conjunction with the initial first tier document identified by input card 55$a$.

When no more input cards are present, this condition is sensed by controls 54, and the initial portion of subsidiary document tree generation is terminated. At this point, dump file 56 contains a complete subsidiary document tree made up of sequentially numbered words, each word containing information relating to a single document. The words are arranged in ascending tier order.

The contents of dump file 56 at this stage may be visualized by referenced FIG. 7, wherein the entries correspond to the example utilized hereinabove in conjunction with FIGS. 2 through 6. Not in FIG. 7 that the D/F words are present in sequential order, as indicated by the contents of sequence number field 75. Further, each D/F entry includes a document number, date and data in field 71, 72 and 73, respectively. The words are ordered so that the first entry (sequence R=1) is a first tier (N=1) document, the second entry (R=2) being the first subsidiary document thereof. Successive entries have tier values reflecting the fact that they are subsidiary to a particular previously culled document. At this point, the reference number field 76 and first tier parent field 77 of each D/F word is empty.

The next step in dump file preparation is to enter into the reference number field 76 of those documents which have been retrieved more than once the sequence number at which the document first appeared at the lowest tier level. It will be appreciated from the foregoing discussion that this reference number will correspond to the value $R$ in lowest sequence number in lowest tier field 66 of the corresponding M/F parent document word.

To provide the reference number information, the following operation is carried out sequentially for each word in dump file 56. First, the document identification number contained in field 71 of the D/F word is stored, and a search of master file 51 carried out to find the M/F word from which the dump file word originally was prepared. Next, the tier value N (as stored in field 74 of the D/F entry) is compared with the lowest tier ($N$) value stored in field 65 of the corresponding M/F word. If N>$N$, this implies that the document appears at a lower tier level elsewhere in the generated subsidiary tree; in this instance, the value $R$ is copied from field 66 of the M/F word into reference number field 76 of the corresponding D/F word.

Should value N=$N$, a comparison is made by arithmetic unit 53 to determine whether the sequence number R stored in field 75 of the D/F word being operated on is equal to or greater than the value of $R$ stored in field 66 of the retrieved M/F word. If R=$R$, this implies that the D/F word being operated on represents first occurrence at the lowest tier level of the particular document; in this instance, reference field 76 of the D/F word is left empty. Should R>$R$, the implication is that the document previously has appeared at the same tier level, but with a lower sequence number; in this instance, the value of $R$ from field 66 of the M/F word is copied into the reference number field 76 of the D/F word. D/F field 76 then will contain the sequence number at which the document first appeared.

It may be seen from the dump file detail subsidiary document tree of FIG. 7 that the document AN-TT-T-256 appears twice, at different tier levels. The first occurrence (at sequence number 9) is at tier 4, while the second occurrence (at sequence number 11) is at tier 3. This situation is reflected by the entry in the reference number column 76 of the D/F word having sequence number 9. Note that the reference number there entered, 11, corresponds to the sequence number at which the same document initially appeared at the lowest tier order.

When the preceding reference number insertion operation has been completed for all D/F entries, preparation of the detail subsidiary document identification tree is complete. If desired, the detail subsidiary document tree now may be printed out utilizing printer 57 (see FIG. 1). Typically, it may be desired to obtain a printout in which all information relating to a particular subsidiary document tree entry is printed on one line. This readily may be accomplished by using printer 57 to reproduce each word from dump file 56 on a separate printed line. By printing the words consecutively in sequence order, the printed output will contain a properly arranged, tier-ordered detail subsidiary document tree. As an option, rather than printing the tier information in field 74 of the D/F word, this tier value may be used to control indentation of the printed document identification number. This formating may be accomplished in memory unit 52 under the direction of controls 54.

It is clear that the detail subsidiary document tree generated as described hereinabove may contain multiple entries for the same document, as examplified, by entries 9 and 11 in the detail tree illustrated in FIG. 7. For some applications it is desirable to obtain a nonredundant listing of the documents present in the generated detail subsidiary document tree. Such a "filtered" subsidiary document tree readily may be obtained using the information present in dump file 56 at the end of detail specification tree preparation.

Note that if a document appears more than once in the generated detail subsidiary document tree, there will be more than one data word in dump file 56 having the same document identification number. However, all but one of these D/F words will have an entry in reference number field 76, the entry therein corresponding to the sequence number of the single D/F word representing the first occurrence at the lowest tier of the particular document. The D/F word for this first occurrence at the lowest tier will have a vacant reference number field 76. Thus, a filtered specification tree may be generated simply by printing out on printer 57 only those words in dump file 56 which do not have an entry in reference number field 76.

A somewhat more sophisticated filtered subsidiary document tree may be generated by initially sequentially scanning each entry of dump file 56 and printing out only those words having a tier value N=1 in tier field 74, and having no entry in reference number field 76. Subsequently, a second sequential scan of each entry in dump file 56 is made, and a printout made of each word having a tier value N=2 in field 74 and no entry in reference number field 76. The same procedure is repeated for each higher tier value N until all tiers have been printed. If desired, indentation of the document identification number again may be made to conform to the tier level at which the document appears.

Additional sophistication of the filtered subsidiary document tree may be obtained by printing out adjacent each second or higher tier document description the document identification number of the first tier document to which this particular document is subsidiary. This first tier parent document listing may be obtained in the following manner.

Prior to printing out the filtered specification tree in a manner described hereinabove, each word in dump file 56 is scanned sequentially. The first word scanned (R=1) will be a first tier document (i.e., N=1). The document identification number of this first tier document is stored in an appropriate location in memory 52 or other suitable register. Then, as each consecutive word is scanned, a comparison is made by arithmetic unit 53 to determine whether or not the D/F word represents a first tier (N=1) document. If it does not (i.e., if the contents of field 74 of the D/F word >1), the first tier document identification number stored in memory 52 is copied into first tier parent field 77 of the D/F word (see FIG. 3).

This procedure is continued until the next first tier document is culled from dump file 56. At this time, the document identification number of the new first tier document is substituted in memory 52 for the first tier document identification number previously stored therein. For subsequent non-first tier documents, this new first tier document identification number is copied into field 77. This procedure is repeated until the entire dump file 56 has been scanned.

Now, when the filtered subsidiary document tree is printed out as described hereinabove, the printed description will include a listing (printed from field 77 of the D/F words) indicating the first tier document from which the subsidiary document depends. Note that entry of first tier document information into the words in dump file 56 need only be carried out for those D/F words in which the reference number field 76 is vacant.

Since the documents referenced by the entries in master file 51 are subject to change, revision, amendment or cancellation, it occasionally is necessary to determine what differences if any exist between the documents subsidiary to a given set of first tier documents on two different dates. Thus, for example, if a detail subsidiary document tree is generated for a government specification as of a first control date, typically the date on which a proposal is submitted, this specification tree may differ in content from a specification tree generated from the same first tier documents as of a later control date, typically the date of contract award.

Differences between subsidiary document trees generated with two different control dates readily may be determined by comparison of the filtered subsidiary document trees for each of the two dates. Such comparison between filtered trees will indicate which documents include in the earlier list still are present in the later list. The comparison, or "delta" list also will indicate which documents have been changed, revised, amended or cancelled in the interim, and whether new documents, not referenced as subsidiaries as of the earlier date, have been added as subsidiaries as of the later date.

Figures 8B, 8C:
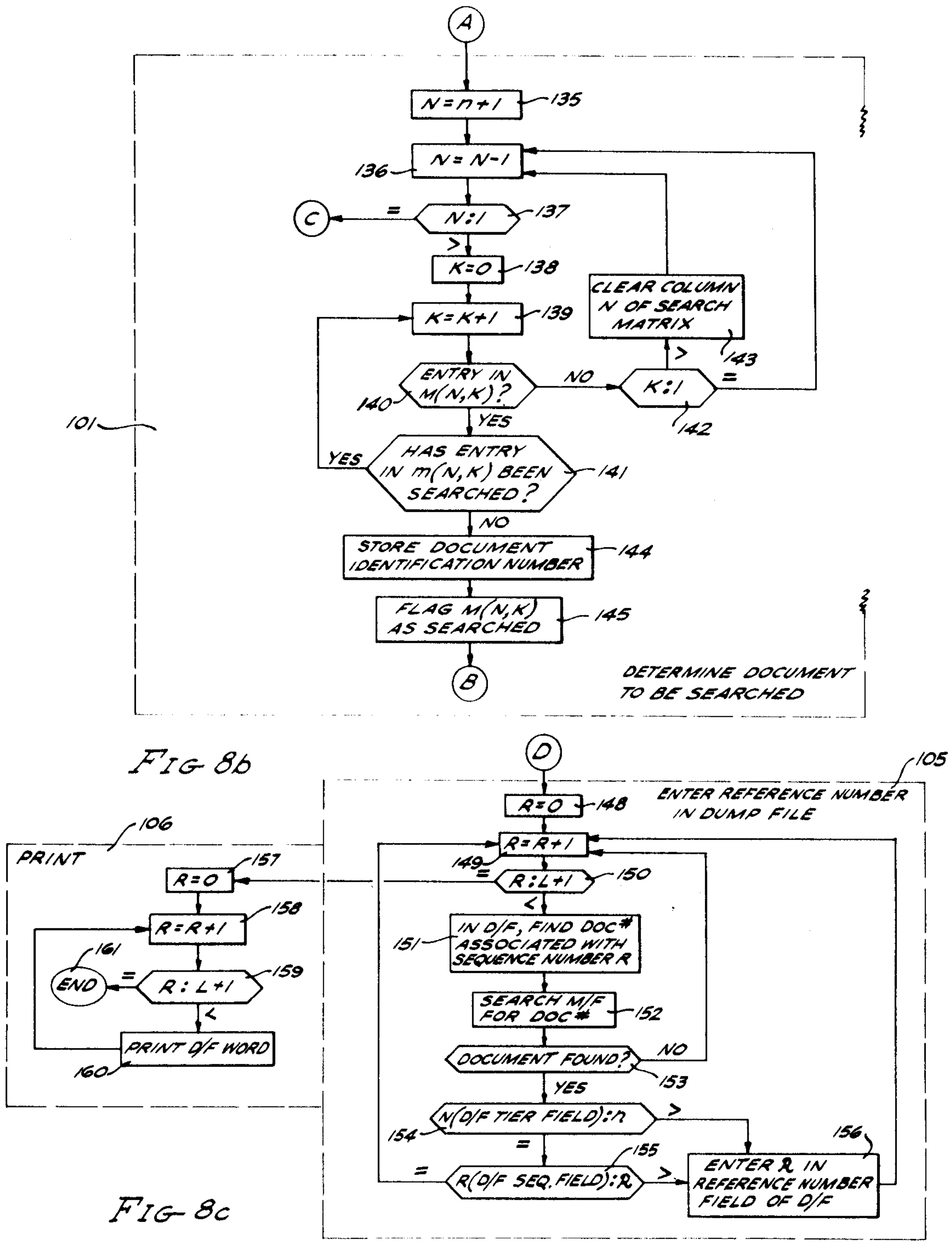

A logic flow chart for the controls 54 of the inventive data processing system for generating a detail subsidiary document tree is shown in FIGS. 8a, 8b and 8c. Conventional flow chart notation is used in this diagram, with rectangular blocks indicating processes or operations to be performed. Hexagonal boxes represent a comparison to be made, a particular branch route being taken from a hexagonal block when the mathematical relationship associated with that route represents in fact the comparison of those quantities that are associated by the colon; i.e. when the mathematical relationship may be substituted for the colon. Alternatively, a particular exit route is taken from a hexagonal (i.e. conditional) block when the condition associated with that route represents in fact the condition determined by the required operation.

The program is initiated by a start operation 100 (see FIG. 8a), and thereafter passes through a sequence of operations represented by blocks 110 through 160 that sequentially determine the different portions of the program. The final operation is END 161. Six major loops are involved in this control program; they are a loop 101 that determines the next document to be searched in master file 51; a second loop 102 which controls searching and tagging of master file 51; a third loop 103 which directs preparation of memory search matrix portion 52a; a fourth loop 104 which directs entry of information into dump file 56; a fifth loop 105 which controls entry of the reference numbers in the dump file words; and a sixth loop 106 which controls printout of the detail subsidiary document tree. As used herein, the term "loop" means a computer program subroutine or a sequence of steps or instructions carried out, e.g., by the data processing system 50. The following description of the separate component blocks of the control program also indicates the interrelationships of these components.

Blocks 110, 111 and 112 - Initiation of the start operation causes these blocks to set initial values of certain variables. In particular, block 110 clears the *N* and *R* fields of all words in master file 51 by entering 0's in fields 65 and 66 of each M/F word. Block 111 sets the initial values of the variables R and L. These variables, like the other variables N and K used in the control system, each may be stored in appropriate portions of memory 52 or in any other suitable registers. The variable R, which represents the sequence number of the entry in dump file 56, initially is set to zero. The variable L, which represents the total number of entries in dump file 56 and hence is unknown at the start of the program, initially is set to zero. Block 112 controls storage of the values of the constant *n* and the search control date in appropriate portions of memory 52 or other registers. The constant *n* represents the highest tier to be included in the detail subsidiary document tree generated by the inventive system. The control date, as described hereinabove, sets the effective date for documents searched in master file 51.

Block 113 - Initial entry into control loop 101 is via block 113, which directs card reader 55 to read the initial first tier document card 55a (see FIG. 1). The contents of card 55a, that is, the document identification number of the initial first tier document to be searched, then is entered into a register portion of memory 52, or into other suitable register in data processing system 50.

Block 114 - This block sets the initial value of the variable N which (except where noted) represents the tier of the document presently being searched in master file 51. As noted in block 114, initially N is set to 1, indicating that a first tier document is being searched.

Block 115 - An augmentation operation is performed wherein the value of R previously stored in memory 52 or other register is augmented by 1. As will presently become apparent, the value of R, which represents the sequence number of the entry in dump file 56, is augmented by 1 each time a new document is searched in master file 51.

Block 116 - Master file 51 is searched to cull therefrom the word having the document identification number corresponding to that stored in the register portion of memory 52 during loop 101 execution. In addition, block 116 ensures that the word selected from master file 51 represents the latest entry (i.e., most recent date) for the desired document prior to the control date set by block 112.

Block 117 - As indicated by its hexagonal shape, block 117 represents a conditional operation. In this case, the output route taken from block 117 depends on whether or not a word associated with the desired document identification number has been found during the search of master file 51 directed by block 116. In most cases, such an entry will be found, and the output route marked YES will be followed. However, should there be no entry in master file 51 corresponding to the sought document, the output route designated NO will be followed. In the latter instance, the system will skip the search matrix preparation loop 103 and go directly to the dump file entry preparation loop 104.

Block 118 - This comparison block utilizes arithmetic unit 53 to compare with zero the contents of *N* field 65 of the data word culled from master file 51 by block 116. Should the entry in M/F word field 65 equal 0, the = branch route is taken directly to block 120. This condition will always occur when a particular document word is culled from master file 51 for the first time. Should *N* be greater than 0, indicating that the document word has previously been accessed from master file 51, the > output route directly to block 119 is taken.

Block 119 - A comparison is now carried out by arithmetic unit 53 between the present value of the variable N and the non-zero value of *N* read from field 65 of the culled master file word. If N *N*, the output route is taken directly to search matrix preparation loop 103; this condition occurs when the document word previously was culled from master file 51 either at a lower tier, or at the same tier but with a lower sequence number.

Block 120 - When a document word is culled from master file 51 for the first time, or for the first time at a lower tier than previously accessed, the value of N presently stored in memory 52 is copied into the lowest tier (*N*) field 65 of the culled M/F word.

Block 121 - The same conditions which dictate making an entry in the *N* field by block 120 also dictate entry of the current sequence number R into the lowest sequence number (*R*) field of the culled M/F word. This completes searching and tagging of the master file (loop 102), and initiates entry of the search matrix preparation loop 103.

Block 122 - By comparing N with *n*, as in arithmetic unit 53, a determination is made as to whether the document searched by loop 102 was at the highest tier level desired for the specification tree being generated. If so, that is, if N = *n*, the subsidiaries listed in the culled word themselves need not be searched (being of a tier higher than that required for generation of the subsidiary document tree). In this instance, the output route marked = is taken and the program skips directly to dump file entry preparation loop 104. However, should the searched document be at lower than the maximum desired tier (N<n), the < output route to block 123 is taken.

Block 123 - The initial value of variable K, as stored in an approximate portion of memory 52 or other suitable register, is set to 0. As discussed earlier in conjunction with FIGS. 4, 5 and 6, K represents the rank or row of search matrix portion **52*a* of memory 52**.

Block 124 - This block augments by 1 the value of the variable N previously stored in memory 52 or other register. Since the previous value of N represented the tier of the document currently searched in master file 51, the augmented value N = N+1 represents the tier at which the subsidiary documents listed in the data word culled from master file 51 will themselves be searched. Thus, the new value of N corresponds to the column designation in search matrix **52*a* into which the subsidiaries will be placed, as described hereinabove in conjunction with FIGS. 4, 5 and 6**.

Block 125 - The value of K is augmented by 1, thus setting the row value of search matrix **52*a*. When entered from block 124, K initially is set to 1**.

Block 126 - This conditional block determines whether a previously entered document identification number is present in tier N, row K of search matrix **52*a*. (The nomenclature M(N,K) represents a location in search matrix 52a defined by the column and row values N and K.) Should an entry already by present at this matrix location, the YES output route from block 126 is taken, leading back to block 125 and causing augmentation by 1 of the value of K. Of course, this YES route will be followed until K reaches a value corresponding to the rank of the first vacant location in column N of search matrix 52*a*. When this condition is met, the NO route from block 126** will be taken.

Block 127 - Field 64 of the document word culled from master file 51 now is inspected to determine whether any subsidiary document identification numbers are contained therein which have not yet been entered into search matrix **52*a*. If so, the YES route to block 128 is taken. If not, the NO exit route to block 129 is followed. Note that the first time block 127 is entered for a particular M/F word, if no subsidiary document identification numbers are contained in field 64 thereof, the NO exit route will be taken. If at least one subsidiary is listed, the subsidiary from field 64*a* will be operated on first. As noted in the block 128 description below, subsidiary documents previously entered in matrix 52*a*** may be flagged to indicate such prior entry.

Block 128 - This operation block causes one of the subsidiary document identification numbers contained in fields **64*a*, 64*b*, 64*c*, ... 64*i* of the data word culled from master file 51 to be entered into location M(N,K) in search matrix 52*a*. As determined by block 126, location M(N,K) previously was vacant. The field from which the subsidiary document identification number is copied may be flagged to indicate that the number has been entered in search matrix 52*a*. The exit route from block 128 is back via blocks 125 and 126 to block 127. Block 127 then re-tests whether all of the subsidiary document identification numbers from M/F word field 64 have been entered (by block 128) into search matrix 52*a***.

Block 129 - The value of N now is decremented by 1, so that the new value (N=N−1) once again corresponds to the tier of the document searched in master file 51 by loop 102. Such decrementing of N also completes search matrix **52*a* preparation, and the system enters dump file entry preparation loop 104**.

Block 130 - The date and document data from fields 62 and 63 of the word culled from master file 51 by loop 102 is copied into the corresponding date and document data fields 72 and 73 of the word being prepared in dump file 56. This operation, of course, is under the control of unit 54 (see FIG. 1) and the actual data transfer typically may take place by an initial transfer from random access storage device 51 to memory 52, and subsequently from memory 52 to storage file 56.

Block 131 - If no document word were culled from master file 51 during search loop 102, block 131 is operative to cause an entry to be made in the dump file word being prepared, indicating that no corresponding master file word was uncovered. Typically, the words "AVAILABILITY BEING RESEARCHED" may be entered into the document data field 73 of the dump file word being prepared.

Block 132 - The identification number of the document being searched (as determined by loop 101) is copied from the register portion of memory 52 into the document identification number field 71 of the dump file word being generated. The number could be copied directly from field 61 of the culled M/F word.

Blocks 133 and 134 - Those blocks respectively cause the sequence number R and the tier value N to be copied from the registers or portions of memory 52 in which these variables are stored into the sequence number and tier fields 74 and 75 respectively of the dump file word being prepared. This completes generation of the dump file word, except for entry of the reference number in field 76; reference number entry is controlled by loop 105 described hereinbelow. The control system now branches back to loop 101 to determine the identification number of the next document to be searched in master file 51. In particular, the output route from block 134 (marked A in FIG. 8*a*) is directly to block 135 (see FIG. 8*b*).

Block 135 - Scanning of search matrix 52*a* is initiated to determine the next document to be searched in master file 51. Block 135, in conjunction with blocks 136–142, insure that the order of scanning of search matrix 52 conforms to that described hereinabove in conjunction with FIGS. 4,5 and 6. In particular, block 135 initially sets the variable N to the value $n+1$, where it will be recalled that $n$ represents the highest tier desired for the detail subsidiary document tree being generated.

Block 136 - This operational block decrements N by 1, so that the highest tier column of search matrix 52*a* is scanned first, followed sequentially by searches of lower tiered columns.

Block 137 - A comparison is performed by arithmetic unit 53 to determine whether the current value of N is equal to or greater than 1. If equal, this implies that all entries of search matrix 52*a* have been searched, and that the next document to be searched is at first tier level. In this instance, the = output route is taken directly to block 146 (see FIG. 8*a*). If N is greater than 1, the > output route is taken to block 138.

Blocks 138 and 139 - In block 138, the variable K (designating the row in search matrix 52*a*) initially is reset to 0. The value of K then is incremented by 1 each time block 139 is entered.

Block 140 - Search matrix location M(N,K) is interrogated to determine if there is a document identification number stored therein. Note that when block 140 initially is entered, the values of N and K correspond respectively to $n$ and 1; that is, the first search matrix position scanned is that of the highest tier column, first row. If an entry is present at location M(N,K), the YES route is taken to block 141; if no entry is present in the matrix location, the NO route is taken to block 142.

Block 141 - If an entry is present in location M(N,K) of search matrix 52*a*, a check is made to determine whether the entry previously has been searched by loop 102. Typically, this may be done by determining whether the entry in location M(N,K) has been flagged, as for example, with an asterisk as described hereinabove in conjunction with FIGS. 4, 5 and 6. If the entry has been searched, the YES output route is taken back to block 139, the value of K incremented by 1, and a check made in the same column, next higher row, to determine if that entry has been searched. If the entry in M(N,K) has not been searched, the output route marked NO is followed from block 141 to block 144.

Block 142 - If, as determined by block 140, there is no entry in a particular location M(N,K) of search matrix 52*a*, block 142 is entered. A comparison is made by arithmetic unit 53 as to whether the value of K is greater or equal to 1. If equal, this implies that the column (i.e. tier N) being interrogated in search matrix 52*a* has no entries. In this instance, the = output route is followed and the program loops back to block 136, decrementing N and initiating a scan of the next lower tier column of search matrix 52*a*. If K is greater than 1, this implies that all entries in column N of search matrix 52*a* have been searched. In this instance, the > output route is followed to block 143.

Block 143 - This operational block causes all entries to be cleared from column N of search matrix 52*a*. Since block 143 is entered only when all entries in column N previously have been searched, the operation block serves the function of periodically clearing a particular column of memory search matrix portion 52*a* of information no longer needed by the program.

Block 144 - When the highest tier, lowest rank, unsearched entry in search matrix 52*a* has been found, the NO output route from block 141 to block 144 will be followed. Operational block 144 then causes the document identification number stored in location M(N,K) of search matrix 52*a* to be copied into the register portion of memory 52 which contains the document identification number to be searched by loop 102. Of course, this new document identification number replaces that number previously stored in the memory register portion.

Block 145 - The entry in search matrix location M(N,K) now is flagged, as with an asterisk, to indicate that it has been searched. The output from block 145 (marked B in FIG. 8*b*) is directly to block 115 (see FIG. 8*a*) causing incrementing of sequence number R and initiation of search in master file 51 (as directed by loop 102) for the word identified by the document identification number newly stored in memory 52.

Block 146 - If scanning of search matrix 52*a* indicates (by an = output from comparison block 137) that all entries in matrix 52*a* have been searched, all subsidiary documents of the previously read first tier document card now have been found. In this instance, conditional block 146 is entered and a test is made to determine if an additional first tier document card (such as card 55*b* shown in FIG. 1) is present in card reader 55. If such a card is present, the YES output route to block 113 is followed, and the system repeats itself as described hereinabove. If no more first tier document identification cards are present, generation of the detailed subsidiary document tree is complete with the exception of assignment of reference numbers in field 76 of each dump file word. In this instance, the NO route from block 146 is followed to block 147.

Block 147 - The variable L is set equal to R. Since the present setting of sequence number R corresponds to the total number of entries generated in dump file 56, L now indicates the size (i.e. number of words) of dump file 56. The exit from block 147 (marked D in FIG. 8*a*) is directly to block 148 in loop 105 (see FIG. 8*c*) causing initiation of dump file reference number assignment.

Blocks 148 and 149 - As an initial step in the reference number assignment loop 105, the variable R is set to zero by block 148. The variable R, representing the dump file sequence number, is incremented by 1 by block 149.

Block 150 - A comparison is made, as by arithmetic unit 53, between the present value of the variable R and the variable L+1. Recall that L previously was set to equal the highest sequence number present in the dump file, thus block 150 recognizes when the entire dump file has been scanned; this condition (R = L+1) causes the = exit route to be taken to block 157, terminating the reference numeral insertion loop. If R< L+1, the entire dump file has not been scanned, and the < exit route from block 150 is taken to block 151.

Block 151 - In the dump file, the word having sequence number R in field 75 is accessed, and the document identification number stored in field 71 of this accessed word is copied into a portion of memory 52 or other appropriate register.

Block 152 - Master file 51 again is searched for a word having the document identification number just stored in memory 52 and having the date most recently preceding the control date.

Block 153 - This conditional block determines whether a word having the stored document identification number was found in master file 51 during the search just carried out. If an appropriate master file entry was found, the YES exit route to block 154 is taken. If no corresponding master file entry was found, the NO exit route back to block 149 is taken.

Block 154 - A comparison now is performed, as by arithmetic unit 53, between the value of N stored in tier field 74 of the dump file word having sequence number R, and the value of *N* stored in the lowest tier field 65 of the word just culled from master file 51. If N>*N*, this implies that the document identified by the D/F word having sequence number R appears elsewhere in the generated subsidiary document tree at a lower tier level. In this case, the > route is taken to block 156. If N=*N*, the = route to block 155 is taken.

Block 155 - This block is entered when the tier N of the sequence R D/F word corresponds to the lowest tier at which the identified document appears in the generated subsidiary document tree. In this instance a comparison is made, as by arithmetic unit 53, between the present sequence number R, and the lowest sequence number in the lowest tier (*R*) at which the identified document appears in the specification tree. If R=*R*, this implies that the dump file word represents the first occurrence of the identified document; in this case, reference number field 76 of the D/F word is left vacant and the = route is taken back to block 149. If R>*R*, this implies that the identified document previously has appeared in the generated subsidiary document tree at the same tier, but with a lower sequence number *R*. In this instance, the > exit route is taken to block 156.

Block 156 - The lowest sequence number in the lowest tier (*R*) now is copied from field 66 of the culled M/F word into reference number field 76 of the dump file word having sequence number R. An exit route then is taken to block 149, the sequence number R incremented by 1, and the loop repeated for the next entry in dump file 56. As noted, loop 105 repeats itself until each entry dump file 56 has been scanned and, if necessary, provided with a reference number in field 76. At the end of loop 105 those words which represent the first occurrence at lowest tier level of a particular document identification number will have no entry in reference number field 76.

Blocks 157, 158 and 159 - These blocks in print loop 106 initially reset the value of variable R (representing the sequence number) to zero, increment R by 1, and test the present value of R to determine if it exceeds the size (L) of dump file 56. If R<L+1, the < exit from block 159 is taken to block 160. If R exceeds the size of dump file 56, the = exit from block 159 is to the end of program block 161.

Block 160 - Under direction of controls 54, printer 57 is used to print out the dump file 56 word having sequence number R. Typically, the entire D/F word first may be copied into memory 52, followed by the actual printing of the word from memory 52. As was discussed in detail hereinabove, the printout may include the tier number, or the tier information may be utilized to control identation of the printed document identification number. When the D/F word has been printed, an exit route is taken back to block 158, causing the sequence number R to be incremented by 1, and initiating printout of the next sequential dump file word.

Block 161 - Generation of the printed detail subsidiary document tree is complete when END block 161 is reached. The printed subsidiary document tree now lists all documents, up to highest tier level, subsidiary to the first tier documents originally identified by the information on input cards 55a, 55b, ... read by card reader 55.

It will be apparent that various modifications may be incorporated in the above described detail subsidiary document tree generation system by one skilled in the data processing system art. For example, the first tier document identification numbers need not be provided to system 50 by means of card reader 55, but could be provided via other appropriate input device such as a magnetic tape unit, a manual input/output typewriter, a set of selection switches or the like. Similarly, the first tier document identification numbers may be provided by means of a remotely located ("on-line") input device such as a teletypewriter keyboard.

Similarly, while a printed output has been obtained (see loop 106 in FIG. 8c) by utilization of printer 57, this is not necessary. Thus, a complete detail subsidiary document tree without reference numbers is contained in storage file 56 at the time an output is obtained from block 147 (see FIG. 8a). A complete detail subsidiary document tree including reference numbers is present in storage file 56 when the = exit route from block 150 (see FIG. 8c) is reached. Should storage file 56 comprise, for example, a magnetic tape unit, the tape itself may constitute the system output. Alternatively, the information contained in dump file 56 may be provided as an output to a separate memory, disc, drum or tape storage unit, may be used to punch a deck of output cards, may be displayed on an alpha-numeric video output console, or may be used to print out the detail subsidiary document tree at a remote location using an on-line remote printer or teletypewriter.

The detail subsidiary document tree generated as described above in conjunction with FIGS. 8a, 8b and 8c, may contain multiple entries, at the same or different tier level, for the same document identification number. Often it is desirable to provide a filtered subsidiary document identification list containing only one entry for each different document contained in the detail subsidiary document tree. Generation of such a filtered tree has been described in general hereinabove, and may be carried out by the data processing system 50 of FIG. 1 in accordance with the control system described by the flow chart of FIG. 9.

Referring now to FIG. 9, filtered tree generation is initiated at START block 200, and proceeds through two loops. A first loop 201, comprising blocks 211 through 217, controls the entry of the first tier parent document identification number into the various lower tier D/F words. Upon completion of loop 201, generation of the filtered subsidiary documentary is carried out by compilation loop 202, comprising blocks 218 through 229. Note that the system described in FIG. 9 utilizes a previously prepared dump file, containing detail subsidiary document tree information, typically generated by a control system such as that described in conjunction with FIGS. 8a, 8b and 8c. There follows a description of each block included in the flow chart of FIG. 9.

Block 210 - Initially the values of the highest tier (n) desired for the filtered subsidiary document tree, and the highest sequence number present in the dump file (L =D/F size) are entered into locations in memory 52 or other appropriate registers.

Blocks 211, 212 and 213 - The variable R, corresponding to the sequence number, initially is set to zero, then incremented by 1 by block 212. Block 213 tests to determine if R exceeds the size of the dump file. If not, the < exit route to block 214 is taken; if R does exceed the highest sequence number of an entry in the dump file, the = exit route from comparison block 213 is taken directly to block 218 in compilation loop 202.

Block 214 - A comparison is carried out, as by arithmetic unit 53, between the value of N stored in the tier field 74 of the D/F word having sequence number R, and the number 1. If N=1, implying that the D/F word corresponds to a first tier document, the = exit route to block 215 is followed. If N>1, indicating the the D/F entry corresponds to a subsidiary document, the > exit route to block 216 is taken.

Block 215 - If the D/F word relates to a first tier document, the document identification number from field 71 is stored in memory 52 or an appropriate storage register. The control system then loops back to block 212, incrementing the value of sequence number R.

Block 216 - If the D/F entry having sequence number R corresponds to a subsidiary (second or higher tier) document, the reference number field 76 of the D/F word is interrogated to determine if there is an entry in this field. If an entry is present, this indicates that the corresponding document (identified by the contents of field 71) appears elsewhere in the detail subsidiary document tree, either at a lower tier level or with a lower sequence number. In this instance, the D/F entry will not be used in the filtered tree, and the YES exit route from block 216 is taken back to block 212. However, if there is no entry in the D/F reference number field 76, the NO exit route is taken to block 217.

Block 217 - Since the D/F word having sequence number R relates to a document appearing for the first time, the first tier document number stored by block 215 now is copied into the first tier parent field 77 of the D/F word. The exit from block 217 is back to block 212.

Blocks 218, 219 and 220 - When all D/F entries have been scanned by loop 201, filtered tree compilation loop 202 is entered, and initially (block 218) the variable N is set to zero. By block 219, the value of N (representing the tier level) is incremented by 1. Block 220 tests to determine when N exceeds the highest tier (n) desired for the filtered tree. When $N=n+1$, the = exit route is taken to block 226. When $N<n+1$, the < exit route is followed to block 221.

Blocks 221, 222 and 223 - For each tier (i.e., for each value of N) the variable R initially is set to zero by block 221. The sequence number R then is incremented by 1 in block 222, and R is tested in block 223 to determine if it is larger than the dump file size. If R exceeds the dump file in size ($R=L+1$) the = exit route back to block 219 is taken, thereby incrementing the tier value N. If R does not exceed the D/F size, the < exit route is taken to block 224.

Block 224 - The dump file word having sequence number R is interrogated to determine if there is an entry in the reference number field 76. If no entry is present in field 76, this indicates the first occurrence of the document identified by the contents of field 71, and the NO output path to block 225 is taken. If an entry is present in reference number field 76, indicating prior occurrence in the detail tree of the document identified in field 71, the YES exit path back to block 222 is taken.

Block 225 - The D/F word corresponding to a document occurring for the first time in the detail subsidiary document tree now is printed, for example, by printer 57. Output from block 225 is back to block 222.

Block 226 - Generation of the filtered subsidiary document tree is complete when block 226 is entered, this situation occurring when the variable N exceeds the highest tier value (n) desired for the filtered tree.

For certain applications it may be desirable to generate in a separate storage unit (not shown in FIG. 1) an auxiliary file containing only the filtered subsidiary document tree information. In this case, blocks 227, 228 and 229 (shown in phantom in FIG. 9) are used instead of block 225.

Block 227 - The NO path from block 224 is taken directly to block 227 (shown in phantom in FIG. 9). This block directs the D/F word having sequence number R be copied into an auxiliary storage unit wherein is formed an auxiliary file (A/F). The auxiliary storage unit may be of any well known type, such as a memory drum, disc, or magnetic tape; the auxiliary storage unit need not be of the random access type. The exit from block 227 is back to block 222, bypassing block 225.

Block 228 - When all of the documents first appearing at tier level N have been entered into the auxiliary file, these tier N entries may be arranged in alphabetic and/or numerical order, as by an appropriate sort and merge operation of the type well known to those skilled in the art. Typically, such sort/merge operation will be carried out utilizing memory 52 and arithmetic unit 53 under the direction of controls 54. Entrance into block 228 is from the = exit path from block 223, while exit from block 228 is directly to block 219. Thus optional block 228 (indicated in phantom in FIG. 9) is utilized in lieu of the direct path from block 223 to block 219 shown by a solid line in FIG. 9.

Block 229 - If desired, after compilation of the auxiliary file, a filtered tree printout having tier N identification numbers arranged in alphabetic and/or numeric order may be obtained using block 229, shown in phantom in FIG. 9. In particular, block 229 is entered when block 220 senses that the variable N is greater than the highest tier desired for the filtered tree; this condition is met subsequent to generation of the entire auxiliary file. A printout of the entire A/F then will include complete filtered tree information. Exit from block 229 is to END block 226, completing performance of loop 202.

The filtered subsidiary document tree generated in accordance with the flow chart of FIG. 9 may be used in the preparation of a delta subsidiary document tree indicating whether changes in subsidiary documents have occurred between two dates. Such a delta specification tree may be prepared by initially generating two filtered trees, one for a first or initial control date (herein identified as date A), and a second generated at a later control date (herein designated date B).

Generation of the delta subsidiary document tree most easily is carried out utilizing auxiliary files, generated in accordance with FIG. 9 including the phantom blocks 227 and 228, for dates A and B. However, the delta subsidiary document tree may be prepared directly from the information contained in the dump file either prior or subsequent to entry of the first tier parent document information in field 77 of the D/F words. For simplicity, the flow chart of FIG. 10 describes delta subsidiary document tree generation utilizing two auxiliary files, generated with control dates A and B, and correspondingly identified as A/F(A) and A/F(B). A description of each block in the delta subsidiary document tree generation flow chart (FIG. 10) follows.

Block 300 - The delta subsidiary document tree generation system is entered at block 300.

Block 301 - Initially, the constant $x$ is set to equal the total number of entries in auxiliary file B.

Blocks 302, 303, and 304 - A variable X initially is set to zero in block 302, then incremented by 1 each time block 303 is entered. The variable X herein represents the order number of words in auxiliary file B. Note that since not all entries from the dump file were copied into the auxiliary file (see loop 202, FIG. 9), and because the auxiliary file may have been rearranged into alpha- or numeric order by document identification number, the contents of the auxiliary file may not be in consecutive sequence number R order. Block 304 tests whether the variable X exceeds the size of auxiliary file B. If so, the = exit route to block 311 is taken; if X is less than the size of A/F(B), the < exit route to block 305 is taken.

Block 305 - The document identification number contained in word X of auxiliary file B is stored in memory 52 or in an appropriate register.

Block 306 - A search is made of auxiliary file A to determine if that file contains a word having a document identification number corresponding to that number stored by block 305.

Block 307 - This conditional block determines whether such a corresponding word is found in auxiliary file A. If no such corresponding word is found, indicating that this subsidiary document was not a member of the detail subsidiary document tree generated at control date A, the NO output route from block 307 is followed to block 309. If a corresponding document is found, the YES output path to block 308 is followed.

Block 308 - If the stored document identification number was included in the auxiliary files generated at both control dates A and B, the contents of the date field of the A/F(A) word is compared with the contents of the date field of the A/F(B) word. This comparison (which may be carried out by arithmetic unit 53) determines whether an amendment, revision, cancellation or other change to the identified document has occurred in the interim between dates A and B. If the date fields are identical, indicating that no revision of the referenced document has occurred in the interim between date A and date B, the = exit branch from block 308 is taken to block 310. If the date field of the A/F(A) word contains a date earlier than that contained in the date field of the corresponding A/F(B) word, this indicates that a revision of the document has occurred in the intervening time, and the < exit route is taken to block 309.

Block 309 - If a document occurs only in auxiliary file B, or occurs in auxiliary file B with a date later than that of the corresponding document word contained in auxiliary file A, the term "PLUS" is entered in the A/F(B) word. The exit from block 309 is back to block 303.

Block 310 - If a revision has occurred in the document identified in the A/F(B) word, the term "MINUS" is entered in this word. The exit from block 310 is back to block 303.

Block 311 - This block is entered after every entry of auxiliary file B has been provided with a "PLUS" or "MINUS" entry. The entire auxiliary file B now is printed out, thereby providing a delta subsidiary document tree in which is listed all of the parent and subsidiary documents present in the filtered subsidiary document tree on the later (B) control date. The delta tree provides an indication as to whether each document listed therein represents either an addition or change from the filtered subsidiary document tree at the earlier (A) control date, or whether the document has remained unchanged in the interim between dates A and B.

Block 312 - On completion of the printout, delta subsidiary document tree generation is complete.

It will be apparent from the immediately foregoing description that the printout obtained will not list documents included in the filtered subsidiary document tree at the earlier (A) control date but not present in the filtered subsidiary document tree at the later (B) control date. Optional blocks 313, 314, and 315 (shown in phantom in FIG. 10) may be utilized to include such information.

Block 313 - This block is entered via the YES output branch from block 307; the exit route from block 313 is to block 308. Block 313 (shown in phantom in FIG. 10) operates appropriately to mark or flag each word in auxiliary file A having a document identification number corresponding to that of a word in auxiliary file B.

Block 314 - This block is entered via the = branch from block 304, after every document in auxiliary file B has been provided with a "PLUS" or "MINUS" designation. The block is operative to enter the word "CANCEL" in all auxiliary file A words which are unflagged. Such unflagged words represent documents present in the control date A filtered subsidiary document tree, but not present in the filtered tree at control date B.

Block 315 - All unflagged auxiliary file A words are merged in appropriate tier and/or alpha-numeric order into auxiliary file B. At the end of this operation, auxiliary file B contains not only those documents present in the filtered tree at control date B, but also those documents present in the control date A filtered tree and not present in the filtered tree generated at the later date B. The exit from block 315 is to print block 311.

The invention may be employed with various data processors, exemplary of which is the National Cash Register NCR-315 computer incorporating a card random access memory (CRAM). The NCR CRAM system utilizes decks of flexible, magnetically coated plastic cards. Typically, over 6 million binary bits of information may be stored magnetically on each card. One edge of each CRAM card is provided with a set of tabs uniquely coded to identify that card. The deck of cards is mounted in a holder provided with a set of displaceable support rods. By displacing a selected set of rods, the one CRAM card uniquely coded with a set of tabs corresponding to the displaced rods drops into a magnetic card reader.

Should such a card random access memory be employed as storage device 51 (see FIG. 1) in the inventive control system, the master file may be arranged so that words relating to parent document identification numbers in a certain alpha-numeric range will be contained on known tracks of a particular CRAM card. A catalog or directory file of these alpha-numeric ranges for each M/F card and track then may be maintained, possibly on a separate deck of CRAM cards.

Using such a CRAM system, during operation of loop 102 (see FIG. 8a), when the master file is searched for a word relating to a known parent document identification number, initially the directory file is accessed to determine therefrom the card and track in which the corresponding word is stored. The random access mechanism then is used immediately to drop the identified card for reading by the CRAM system. Only the selected track on the dropped card need be scanned to cull the word having the desired parent document identification number.

Using the CRAM system as just described, several master file word entries relating to the same parent document identification number, but having different dates, preferably are contained in the same CRAM card and track. Selection of the M/F word having the date most recently preceding the control date then may be accomplished by searching only this card and track. Thus a single access of the directory file, and a single card drop, are sufficient to permit culling of the desired master file word.

While the search matrix portion 52a of memory 52 has been described hereinabove (particularly in conjunction with FIGS. 4, 5 and 6) as containing the actual parent document identification numbers, this is not required. In an alternative embodiment, the master file address of the desired parent document may be sorted in search matrix 52a in lieu of the document identification number itself. If using CRAM, this address may comprise the card number, track number, and position within the track at which the master file word related to the desired parent document identification number is located.

When using the NCR CRAM system, the search matrix (see FIGS. 4, 5, and 6) itself may be stored on a CRAM card, rather than in a portion of memory 52. Similarly, with other data processing systems the search matrix may be maintained in a storage unit other than the main memory.

FIG. 8c illustrates that printout of the detail subsidiary document tree generated by the inventive system is accomplished after compilation of the dump file has been completed. Of course, printout may be otherwise accomplished. Thus, if the reference number field 76 information were not required, each entry of the detail subsidiary document tree may be printed out immediately after its preparation. That is, each dump file word may be printed out immediately after performance of operation block 134 shown in FIG. 8a. Alternatively, if the reference number field 76 information is desired, this may be obtained by printing each D/F word immediately after reference number field 76 has been filled (i.e. immediately upon completion of operation block 156 in FIG. 8c, or in the case of those D/F words in which no reference number is entered in field 76, upon utilization of the = exit route from block 155). The printout obtained in the latter situation will be identical to that obtained using the print routine set forth in loop 106 of FIG. 8c.

In the description of the inventive subsidiary document identification system set forth hereinabove in conjunction with FIGS. 4, 5, 6 and loop 101 of FIG. 8b, the identification number of the next document to be searched is determined by reference to search matrix 52a wherein previously searched documents are flagged, as with an asterisk. In an alternative embodiment, illustrated in FIGS. 11a, 11b and 11c, the next document to be searched is determined by reference to search matrix 52a and to a separate table, maintained in memory 52, which lists the rank $K_n(N)$ of the next unsearched entry in each tier N of search matrix 52a. The table also contains the highest value rank $K_f(N)$ of each tier N of search matrix 52 in which a document identification number is stored.

Figure 6:
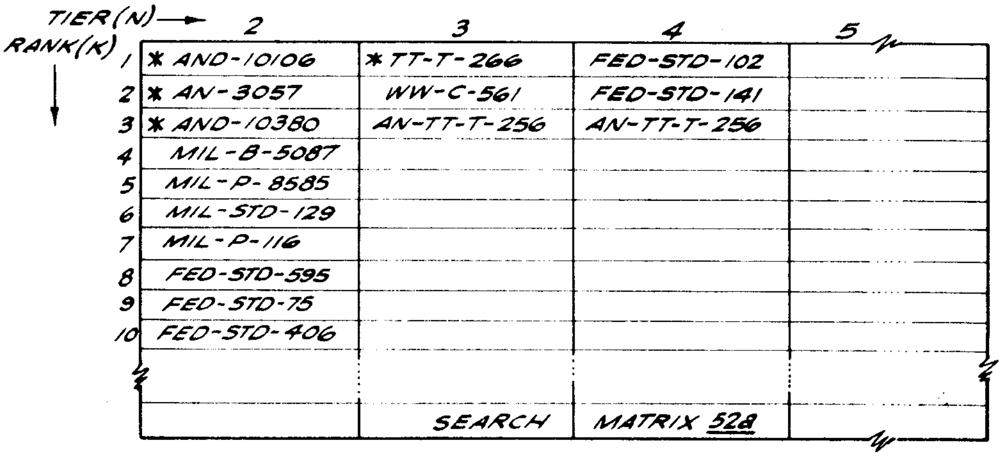

The significance of the terms $K_n(N)$ and $K_f(N)$ may be understood by reference to the examples of FIGS. 4, 5 and 6. In each case, $K_f(2)=10$; that is, the tier N=2 column of search matrix 52a is filled through rank K=10. However, $K_f(3)=0$ for the search matrix configuration shown in FIG. 4, $K_f(3)=1$ for the configuration shown in FIG. 5, and $K_f(3)=3$ for the configuration shown in FIG. 6. Of course, in each case, $K_f(N)$ indicates the highest rank in column N which contains therein a document identification number.

The significance of $K_n(N)$ also may be understood with reference to FIGS. 4, 5 and 6. For the example shown in FIG. 4, $K_n(2)=1$; for FIG. 5, $K_n(2)=2$; and for the example of FIG. 6, $K_n(2)=4$. Similarly, for the search matrix configurations of FIGS. 4, 5 and 6 respectively, $K_n(3)=0$, 1, and 2. In each case, $K_n(N)$ indicates the rank containing the next document identification number of tier N to be searched.

Figure 11B:
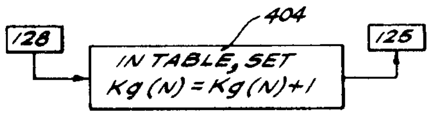
Figure 11A:
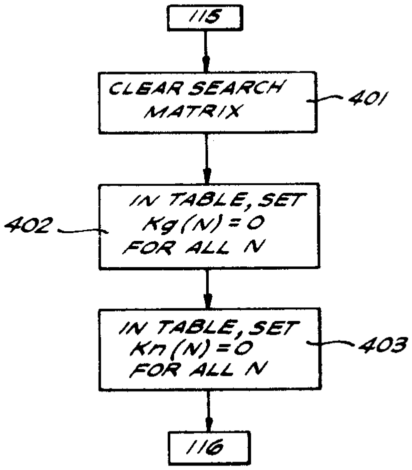
Figure 11C:
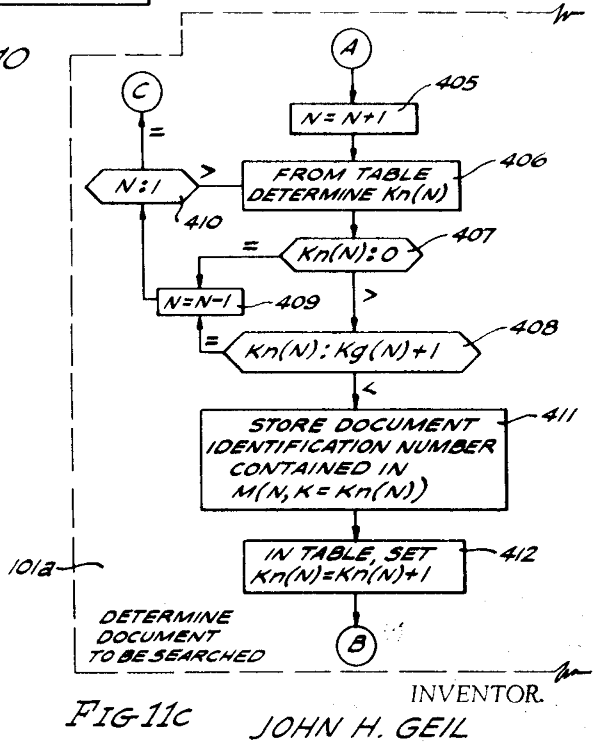

The partial flow charts of FIGS. 11*a*, 11*b* and 11*c*, in conjunction with FIG. 8*a*, illustrate a program of control incorporating a document determination scheme using the values of $K_p(N)$ and $K_n(N)$. In FIG. 11*a*, blocks 115 and 116 correspond to the like numbered operation blocks of FIG. 8*a*. Similarly, in FIG. 11*b*, blocks 128 and 128 correspond to the like numbered operation blocks in FIG. 8*a*. In FIG. 11*c*, the flow chart locations A, B and C correspond to like identified locations in the flow chart of FIG. 8*a*. Note that partial loop 101*a* shown in FIG. 11*c* thus completely replaces partial loop 101 illustrated in FIG. 8*b*. A description of each block included in the partial flow charts of FIGS. 11*a*, 11*b* and 11*c* follow.

Block 401 - This operational block causes all entries in search matrix 52*a* to be cleared. Note that block 401 is entered from block 115; that is, search matrix 52*a* is cleared each time a new first tier document is searched. The exit from block 401 is directly to block 402.

Block 402 - Initially, the values of $K_p(N)$ in the table maintained in memory 52 are set to zero. As noted, the value $K_p(N)$ indicates the rank of greatest value in tier N of search matrix 52*a* in which there is stored a document identification number.

Block 403 - Initially, the values of $K_n(N)$ contained in the table maintained in memory 52 are set to zero. As noted, the value $K_n(N)$ represents the rank in tier N of search matrix 52*a* containing the next unsearched document identification number. The exit from block 403 is directly back to operational block 116 illustrated in FIG. 8*a*.

Block 404 - This block is entered directly from operational block 128 (see FIG. 8*a*). Each time a subsidiary document identification number is entered in tier N of search matrix 52*a* the block increments by 1 the value of $K_p(N)$ in the table maintained in memory 52. Thus, the value of $K_p(N)$ is updated to reflect the new entry made by block 128 in column N of search matrix 52*a*. The exit from block 404 is directly back to block 125 of FIG. 8*a*.

Block 405 - Loop 101*a* is entered directly after completion of operation block 134 shown in FIG. 8*a*. Block 405 increments by 1 the value of the variable N, so that the new value represents a tier one greater than the tier of the last dump file entry.

Block 406 - From the table maintained in memory 52, the value $K_n(N)$ is determined. By way of example, suppose the contents of search matrix 52*a* are as shown in FIG. 6, and the last dump file entry prepared was that corresponding to the third tier document TT-T-266. Block 405 will have incremented the tier value to N=4, and from the memory table, block 406 will determine that $K_n(4)=1$, indicating that the next fourth tier document to be searched is that identified by the entry in rank K=1, tier N=4 of search matrix 52*a*.

Block 407 - This block compares with zero the value $K_n(N)$. If $K_n(N)=0$, indicating that there are no entries in tier N of search matrix 52*a*, the = exit route is taken directly to block 409. If $K_n(N)$ is greater than 0, the > exit route to block 408 is taken.

Block 408 - To insure that $K_n(N)$ is pointing to a search matrix location which in fact contains a document identification number, $K_n(N)$ is compared with $K_p(N)+1$. Since $K_p(N)$ indicates the highest rank in search matrix tier N which contains a document identification number, a sensed equality implies that $K_n(N)$ is pointing to a search matrix position having no entry. In this instance, the = exit route to block 409 is followed. If $K_n(N)$ is pointing to a search matrix position which does contain a document identification number, the < exit route to block 411 is taken.

Block 409 - This block is entered when there is no document identification number in tier N of search matrix 52*a* to be searched. The tier value N is decremented by 1 and an exit is taken directly to block 410.

Block 410 - The value N is compared with 1 to determine whether all documents identified in search matrix 52*a* have been searched. If N=1, the = exit route to block 146 (see FIG. 8*a*) is taken; if not, the > exit route from block 410 is taken back to block 406.

Block 411 - This block is entered when $K_n(N)$ points to a non-searched entry in tier N of search matrix 52*a*. In this instance, the document identification number contained in location $M(N,K=K_n(N))$ from search matrix 52*a* is stored in memory 52, in place of the contents of the parent document number previously stored therein. Of course, this newly stored identification number represents the next document to be searched in the master file by loop 102 (see FIG. 8*a*). The exit from block 411 is directly to block 412.

Block 412 - The value $K_n(N)$ in the table maintained in memory 52 now is incremented by 1, thus the new value $K_n(N)$ represents the rank of the next unsearched entry in tier N of search matrix 52*a*. The exit from block 142 is directly to block 115 shown in FIG. 8*a*.

Thus, it may be seen that the partial flow charts of FIGS. 11*a*, 11*b* and 11*c*, together with the flow chart of FIG. 8*a*, describe a program method for determining from search matrix 52*a* the identification number of the next document to be searched by the inventive parent document identification system.

As an alternative embodiment of the invention, it is possible to generate a detail subsidiary document tree without utilization of a search matrix as described hereinabove. To accomplish this, controls 54 may look directly to a previously culled M/F word to determine the next parent document identification number to be searched by loop 102 (see FIG. 8*a*). The field 64*a*, 64*b*, ..., 64*i* (see FIG. 2) of the M/F word from which this number is obtained may be tagged to indicate that the therein contained document identification number has been searched.

A list or record may be kept, in memory 52 or other storage unit, of the culled M/F words. When the next parent document identification number is required, the first M/F word listed in the record may be checked to see if it contains any untagged (i.e., unsearched) subsidiary document identification numbers. If an untagged number exists, this identifies the next parent document identification number to be searched. If no untagged subsidiary document numbers remain in the M/F word, the word is deleted from the record list. Depending on the order in which M/F words are listed in the record, the generated detailed subsidiary document tree may or may not be tier-ordered.

The master file utilized by the inventive subsidiary document identification system periodically will be updated to enter new M/F words relating to revision, change, amendment or cancellation of previously included documents, or addition of new documents. This master file update may be accomplished by conventional sort/merge routines which may direct that the newly added word be entered in a storage device location adjacent the previously entered M/F words having the same parent document identification number. It may also be desired to insert the update entries in consecutive order by date, as indicated by the contents of field 62 of the M/F words.

New M/F words having parent document identification numbers not previously contained in the master file likewise may be entered at any storage device location, or may be merged in alpha-numeric order with other document identification numbers in the master file. Of course, if a directory file is utilized, this should be updated each time a new master file entry is made.

In the preceding description of the inventive subsidiary document identification system, the master file word format has been described as corresponding to that shown in FIG. 2. As illustrated therein, a single parent document M/F word includes both document description data (in field 63) as well as the identification numbers (in field 64) of documents subsidiary to the parent document. Of course, the invention is not so limited, and the master file may utilize two or more separate words to store this information. For example, the master file may contain two words for each parent document; a first word containing the parent document identification number and various data descriptive of that parent document, and a second word containing the parent document identification number and the list of identification numbers of documents subsidiary to that parent document. These two words relating to the same parent document may be maintained in consecutive order in the master file, or may be randomly located therein.

Referring to FIG. 8a, in a master file utilizing two words as just described, when the operation of block 116 is carried out, both the subsidiary document word and the document data word related to the particular parent document are retrieved from the master file. Then, the operations of blocks 127 and 128 are performed on the M/F word listing the subsidiary documents, and the operation of block 130 is carried out by reference to the master file word containing the document data.

Although the invention has been described and illustrated in detail, it is to be understood that the same is by way of illustration and example only, and is not to be taken by way of limitation; the spirit and scope of this invention being limited only by the terms of the appended claims.

I claim:

1. For use in a data processing system including (a) a random access data storage device for storing a plurality of words comprising sets of data signal combinations representing a parent document identification number and identification numbers of documents subsidiary to said parent document, (b) means for randomly searching said device to cull therefrom a word having a desired document identification number, (c) a storage file and means for entering and retrieving data signal combinations from said file, (d) a memory, a register portion of said memory adapted to store an $N^{th}$ tier parent document identification number, a matrix portion of said memory adapted to store a plurality of document identification numbers in tier and rank order, and (e) control and arithmetic units including means for transferring data signals between said random access storage device and said memory, between said storage file and said memory, and between said arithmetic unit and said memory;

a program method for directing the operation of said data processing system to process a plurality of said words so as to compile in said storage file a set of words representing a tier-ordered detail subsidiary document tree, said program method comprising:

i. a first subroutine including the steps of culling from said random access storage device a word having a parent identification number corresponding to that $N^{th}$ tier parent document identification number stored in said memory register portion; and entering the subsidiary document identification numbers contained in said culled word into said memory matrix portion in N+1 tier, lowest consecutive available rank positions;

ii. a second subroutine including the step of entering the tier value N, the stored $N^{th}$ tier parent document identification number and portions of said culled word into said storage file, said storage file entries being arranged ordinally; and iii. a third subroutine including the steps of determining in said memory matrix portion the unflagged position of highest tier and lowest rank having a document identification number stored therein; flagging said determined position; entering the document identification number stored in said determined position into said memory register portion in place of the previous contents thereof; and causing re-entry of said (i) first subroutine.

2. A program method as defined in claim 1 further comprising the steps of:

initially entering a first tier document identification number in said memory register portion and causing initial entry of said (i) first subroutine; and wherein said (iii) third subroutine further comprises the steps of determining when all memory matrix portion positions having document identification numbers stored therein have been flagged; determining if additional first tier document identification numbers are to be searched; and entering, in response to said all flagged condition, the next additional first tier document identification number in said memory register portion in place of the previous contents thereof and causing re-entry of said (i) first subroutine.

3. A program method as defined in claim 2 comprising the further step of:

printing out contents of said storage file, said printout being initiated when no additional first tier document identification numbers remain to be searched in response to said all flagged condition.

4. A program method as defined in claim 1 wherein said (i) first subroutine further comprises the steps of:

determining if said culled word previously has been accessed at the same or lower tier; and entering, if said culled word has not previously been accessed at the same or lower tier, the tier value $\mathit{N}$ = N and the storage file ordinal sequence number $\mathit{R}$ = R into said culled word.

5. A program method as defined in claim 4 further comprising:

iv. a forth subroutine entered when all storage file entries have been made, and including the steps of identifying the document identification number stored in each storage file word; again culling from said random access storage device the word corresponding to said identified document identification number; comparing the tier value N and ordinal sequence number R of said storage file word with the tier value $\mathit{N}$ and sequence number $\mathit{R}$ present in said again culled corresponding word; and entering the value $\mathit{R}$ into said storage file word if N>$\mathit{N}$ or if N =$\mathit{N}$ and R>$\mathit{R}$.

6. A program method as defined in claim 4 further comprising the steps of:

initially entering a first tier document identification number in said memory register portion and for causing initial entry of said (i) first subroutine; and wherein said (iii) third subroutine further comprises the steps of determining when all memory matrix portion positions having document identification numbers stored therein have been flagged; determining if additional first tier document identification numbers are to be searched, and entering, in response to said all flagged condition, the next additional first tier docu-ment identification number in said memory register portion in place of the previous contents thereof and causing re-performance of said (i) first subroutine.

7. A program method as defined in claim 6 further comprising:

iv. a forth subroutine entered when all storage file entries have been made, and including the steps of identifying the document identification number stored in each storage file word; again culling from said random access storage device the word corresponding to said identified document identification number; comparing the tier value N and ordinal sequence number R of said storage file word with the tier value $\mathit{N}$ and sequence number $\mathit{R}$ present in said again culled corresponding word; and entering the value $\mathit{R}$ into said storage file word if N>$\mathit{N}$ or if N =$\mathit{N}$ and R>$\mathit{R}$.

8. A program method as defined in claim 7 comprising the further step of:

printing out contents of said storage file, said printout being initiated when no additional first tier document identification numbers remain to be searched and in response to said all flagged condition.

9. A program method as defined in claim 1 further comprising the steps of:

determining whether said storage file contains redundant words having the same document identification number, and listing only the non-redundant storage file words.

10. A program method as defined in claim 2 further comprising the steps of:

determining whether said storage file contains redundant words having the same document identification number, and printing out only the non-redundant storage file words, said printout being initiated when no additional first tier document identification numbers remain to be searched and in response to said all flagged condition.

11. A program method as defined in Claim 5 comprising the further step of:

printing out only those storage file words in which no value of R has been entered during said (iv) fourth subroutine.

12. A program method as defined in claim 5 further comprising:

(v) a fifth subroutine entered upon completion of said (iv) fourth subroutine, said fifth subroutine including the steps of entering the first tier parent document identification number in each storage file word of tier N 2 in which no value of *R* has been entered during said (iv) fourth subroutine; and printing out all storage file word in which no value of *R* has been entered during said (iv) fourth subroutine.

13. A program method as defined in claim 1 wherein said memory further comprises a data register portion for storing a control date, wherein said storage device may contain more than one word having the same parent document identification number but with different effective dates, and wherein said (i) first subroutine includes the step of culling that word having the desired parent document identification number and the effective date most recently preceeding said stored control date.

14. A program method as defined in claim 13 further comprising the steps of:

determining whether said storage file contains redundant words having the same document identification number, and preparing an auxiliary file containing the non-redundant storage file words.

15. A data processing system including a data storage device for storing a plurality of words comprising sets of data signal combinations representing a parent document identification number and identification numbers of documents subsidiary to said parent document, means for searching said storage device to cull therefrom a word having a desired parent document identification number, a storage file and means for entering and retrieving data signal combinations from said file, a memory, and control and arithmetic units including means for transferring data signals between said storage device, said storage file, said memory file and said arithmetic unit, all under the direction of a stored program, the improvement wherein said system is programmed to process a plurality of said words so as to compile in said storage file a set of words representing a subsidiary document tree, said stored program comprising:

i. a first subroutine including the step of culling from said storage device a word having a parent document identification number corresponding to an $N^{th}$ tier parent document identification number stored in a portion of said memory or like register;

ii. a second subroutine including the step of storing the subsidiary document identification numbers contained in said word culled by said first subroutine;

iii. a third subroutine including the step of entering the $N^{th}$ tier parent document identification number and portions of said culled word into said storage file; and iv. a fourth subroutine including the steps of determining from said stored subsidiary document identification numbers the next parent document identification number to be searched; entering this next parent document identification number in said memory portion or like register in place of the previous contents thereof; and causing re-entry of said first subroutine.

16. A system as defined in claim 15 wherein said second subroutine utilizes a matrix portion of said memory, said matrix being organized by rank and tier, said subroutine including the further step of entering the identification numbers of documents subsidiary to an $N^{th}$ tier parent document in consecutive rank positions of the N+1 tier of said matrix.

17. A system as defined in claim 16 wherein said second subroutine includes the step of maintaining a table in said memory listing the highest value rank $K_e(N)$ of each tier N of said matrix containing a document identification number.

18. A system as defined in claim 17 wherein said fourth subroutine includes the step of maintaining a table in said memory listing the rank $K_n(N)$ of each tier N of said matrix containing the next unsearched document identification number, said step of determining being responsive to the listed values of $K_e(N)$, $K_n(N)$ and the tier N of the previously searched parent document, said fourth subroutine including the further step of updating said listed values $K_n(N)$ when the next parent document identification number has been determined.

19. For use in a general purpose digital computer having (a) a data storage device for storing a plurality of data words each representing a parent document identification number and identification numbers of documents subsidiary to said parent document; (b) a memory, a register portion of said memory adapted to store an $N^{th}$ tier parent document identification number, another portion of said memory adapted to store program instructions to be performed by said computer; and (c) a storage file;

a computer program for directing said digital computer to process a plurality of said words so as to compile in said storage file a set of words representing a detail subsidiary document tree, said computer program comprising a set of instructions stored in said other memory portion and defining:

i. a first computer directing program subroutine including the steps of culling from said storage device a word having a parent document identification number corresponding to that $N^{th}$ tier parent document identification number stored in said memory register portion and listing said storage device word to indicate that it has been culled;

ii. a second program subroutine including the step of entering the stored $N^{th}$ tier parent document identification number and portions of said culled word into said storage file; and iii. a third program subroutine including the step of determining from said listed storage device word the next subsidiary document identification number to be searched, entering this next document identification number into said memory register portion in place of the previous contents thereof; and causing re-entry of said (i) program subroutine.

20. For use in a data processing system including (a) a random access data storage device for storing a plurality of words comprising sets of data signal combinations representing a parent document identification number and identification numbers of documents subsidiary to said parent document, certain of said words having the same parent document identification number but different effective dates, (b) means for randomly searching said device to cull therefrom a word having a desired document identification number, (c) a storage file and means for entering and retrieving data signal combinations from said file, (d) a memory, a register portion of said memory adapted to store an $N^{th}$ tier parent document identification number, a matrix portion of said memory adapted to store a plurality of document identification numbers in tier and rank order, a data register portion of said memory adapted to store first and second different control dates, and (e) control and arithmetic units including means for transferring data signals between said random access storage device and said memory, between said storage file and said memory, and between said arithmetic unit and said memory;

a program method for directing the operation of said data processing system to process a plurality of said words so as to compile in said storage file first and second sets of words representing first and second tier-ordered detail subsidiary document trees for the respective first and second different control dates, and to compare the contents of said first and second trees, said program method including:

a. a first routine for generating said first detail subsidiary document tree, comprising;

i. a first subroutine including the steps of culling from said random access storage device a word having a parent identification number corresponding to that $N^{th}$ tier parent document identification number stored in said memory register portion and having the effective date most recently preceding said first stored control data; and entering the subsidiary document identification numbers contained in said culled word into said memory matrix portion in N+1 tier, lowest consecutive available rank positions;

ii. a second subroutine including the step of entering the tier value N, the stored $N^{th}$ tier parent document identification number and portions of said culled word into said storage file, said storage file entries being arranged ordinally; and iii. a third subroutine including the steps of determining in said memory matrix portion the unflagged position of highest tier and lowest rank having a document identification number stored therein; flagging said determined position; entering the document identification number stored in said determined position into said memory register portion in place of the previous contents thereof; and causing re-entry of said (i) first subroutine b. a second routine including the steps of determining whether said first detail subsidiary document tree contains redundant words having the same document identification number; and preparing a first auxiliary file containing the non-redundant storage file words of said first tree;

c. a third routine for generating said second detail subsidiary document tree, comprising subroutines identical to the said subroutines (i) through (iii) but culling words having the effective date most recently preceding said second stored control date;

d. a fourth routine including the steps of determining whether said second detail subsidiary document tree contains redundant words having the same document identification number; and for preparing a second auxiliary file containing the non-redundant storage file words of said second tree; and e. a fifth routine for comparing the contents of said first and second subsidiary document trees as contained in the respective first and second auxiliary files generated by said second and fourth routines, comprising the steps of:

storing the document identification number of each word in said first auxiliary file in a storage register portion of said memory; searching said second auxiliary file for a corresponding word having the same document identification number as that stored in said storage register; comparing the effective dates of said corresponding first and second auxiliary file words; and making an entry in said first auxiliary file word indicating whether said corresponding second auxiliary file word was found, and if so, whether the effective date of said second auxiliary file word was earlier than the effective date of said corresponding first auxiliary file word.

* * * * *